(12) United States Patent
Tremblay et al.

(10) Patent No.: US 12,403,528 B2
(45) Date of Patent: Sep. 2, 2025

(54) ALUMINUM MANUFACTURING PROCESS WITH RETROACTION LOOP

(71) Applicant: STAS Inc., Chicoutimi (CA)

(72) Inventors: Sylvain Tremblay, Chicoutimi (CA); Jean-Michel Tremblay-Goupille, Joncquiere (CA)

(73) Assignee: STAS Inc., Chicoutimi (CA)

( * ) Notice: Subject to any disclaimer, the term of this patent is extended or adjusted under 35 U.S.C. 154(b) by 0 days.

(21) Appl. No.: 19/005,639

(22) Filed: Dec. 30, 2024

(65) Prior Publication Data

US 2025/0214138 A1 Jul. 3, 2025

Related U.S. Application Data

(60) Provisional application No. 63/616,087, filed on Dec. 29, 2023.

(51) Int. Cl.
*B22D 46/00* (2006.01)
*G05B 13/02* (2006.01)

(52) U.S. Cl.
CPC .......... *B22D 46/00* (2013.01); *G05B 13/027* (2013.01)

(58) Field of Classification Search
None
See application file for complete search history.

(56) References Cited

U.S. PATENT DOCUMENTS 11,980,933 B2 * 5/2024 Xu .................... B22D 46/00
2019/0361409 A1 * 11/2019 Bettinger .......... G05B 13/0265

FOREIGN PATENT DOCUMENTS

CN 116090805 A * 5/2023

OTHER PUBLICATIONS

Wilk-Kołodziejczyk et al., "Modification of Casting Production Parameters in Order to Obtain Products With the Assumed Parameters With Using Machine Learning", Jul. 2023, International Journal of Metalcasting vol. 17 Issue 4, pp. 2680-2688 (Year: 2023).*
Valais Econony, Aluminum Parts Manufacturing Optimized with AI, May 15, 2023, Online: https://valais-economy.ch/aluminum-parts-manufacturing-optimized-with-ai/.
(Continued)

*Primary Examiner* — David Earl Ogg
(74) *Attorney, Agent, or Firm* — Benoit&Cote Inc.; Mathieu Audet

(57) ABSTRACT

An AI system is adapted to receive at least one parameter to be optimized for an article or its production. The AI system processes the to-be-optimized parameter and generates an operating condition for a first phase of production. The AI system processes the operating condition, and generates an AI operating parameter for processing the aluminum. The production equipment associated with the first phase processes the aluminum accordingly, wherein there is an operating parameter for obtaining aluminum having an optimized quality characteristic at the end of the first phase, and wherein having the production equipment performing the AI parameter generates a deviation. Through the deviations over the different phases, the general production is prioritized over the phases of productions.

20 Claims, 27 Drawing Sheets

(56) References Cited

OTHER PUBLICATIONS

Aaluminum, The Furtur of Aluminum Production: How AI is Revolutionizing the Industry, 2024, Online: https://aaluminum.com/blog/the-future-of-aluminum-production-how-ai-is-revolutionizing-the-industry/.

Valais Economy, Idiap Reaserch Institute: a pioneer of artifical intelligence, Apr. 4, 2023, Online: https://valais-economy.ch/idiap-research-institute-a-pioneer-of-artificial-intelligence/.

Park, S., Youm, S. Establish a machine learning based model for optimal casting conditions management of small and medium sized die casting manufacturers. Sci Rep 13, 17163 (2023). https://doi.org/10.1038/s41598-023-44449-0.

Wilk-Kołodziejczyk, D., Małysza, M., Jaśkowiec, K. et al. Modification of Casting Production Parameters in Order to Obtain Products with the Assumed Parameters with Using Machine Learning. Inter Metalcast 17, 2680-2688 (2023). https://doi.org/10.1007/s40962-023-01076-9.

Ziyu Li a b He Tan c, Anders E.W Jarfors b, Per Jansson a, Lucia Lattanzi b Smart-Cast: An AI-Based System for Semisolid Casting Process Control Received Jan. 3, 2022, Revised Jun. 10, 2022, Accepted Jun. 12, 2022, Available online Mar. 20, 2024, Version of Record Mar. 20, 2024.

Casting Process Improvement by the Application of Artificial Intelligence by Nedeljko Dučić 1ORCID, Srećko Manasijević 2ORCID, Aleksandar Jovičić 1,*, Žarko Ćojbašić 3ORCID andRadomir Radiša Appl. Sci. 2022, 12(7), 3264; https://doi.org/10.3390/app12073264.

Numerical Simulation and Machine Learning Prediction of the Direct Chill Casting Process of Large-Scale Aluminum Ingots Guanhua Guo , Ting Yao , Wensheng Liu , Sai Tang , Daihong Xiao , Lanping Huang , Lei Wu , Zhaohui Feng, Xiaobing Gao Mar. 19, 2024;17(6):1409. doi: 10.3390/ma17061409.

* cited by examiner

| SAMPLE | SPK ST | Al | Cu | Fe | Mg | Mn | Si | Ca | Na | Pb | Ni | Ti |
|---|---|---|---|---|---|---|---|---|---|---|---|---|
| 1 | AVG | 96.71 | 0.176 | 0.541 | 1.185 | 0.849 | 0.323 | 0.00247 | 0.00063 | 0.00453 | 0.0098 | 0.018 |
| 2 | AVG | 96.65 | 0.181 | 0.549 | 1.222 | 0.850 | 0.332 | 0.00253 | 0.00064 | 0.00471 | 0.0102 | 0.018 |
| GROUP | AVG | 96.68 | 0.179 | 0.545 | 1.203 | 0.850 | 0.327 | 0.00250 | 0.00063 | 0.00462 | 0.0100 | 0.018 |
| GROUP | RSD | 0.05% | 1.94% | 1.10% | 2.20% | 0.10% | 1.97% | 1.52% | 1.21% | 2.72% | 3.08% | 1.36% |
| LIMITS | MAX | 100 | 0.19 | 0.6 | 1.26 | 0.94 | 0.35 | 0.006 | 0.0005 | 0.009 | 0.03 | 0.05 |
| LIMITS | MIN | | 0.15 | 0.49 | 1.12 | 0.79 | 0.2 | | | | | |

| SAMPLE | SPK ST | Zn | Bi | Cr | Sn | Be | Cd | Ga | Li | V | Zr | B |
|---|---|---|---|---|---|---|---|---|---|---|---|---|
| 1 | AVG | 0.118 | 0.0003 | 0.031 | 0.0019 | 0.00001 | 0.00009 | 0.0137 | 0.00000 | 0.0121 | 0.0017 | 0.00020 |
| 2 | AVG | 0.120 | 0.0003 | 0.031 | 0.0020 | 0.00001 | 0.00010 | 0.0141 | 0.00000 | 0.0120 | 0.0016 | 0.00018 |
| GROUP | AVG | 0.119 | 0.0003 | 0.031 | 0.0020 | 0.00001 | 0.00009 | 0.0139 | 0.00000 | 0.120 | 0.0016 | 0.00019 |
| GROUP | RSD | 1.46% | | 0.03% | 3.28% | 1.31% | 7.45% | 2.07% | 1.54% | 0.21% | 3.46% | |
| LIMITS | MAX | 0.25 | 0.03 | 0.05 | 0.03 | 0.0001 | 0.0005 | 0.03 | 0.0003 | 0.03 | 0.03 | 0.001 |
| LIMITS | MIN | | | | | | | | | | | |

| SAMPLE | SPK ST | Pb+Cd | Fe/Si | others | Fe+Mn |
|---|---|---|---|---|---|
| 1 | AVG | 0.00462 | 1.6749 | 0.0000 | 1.39 |
| 2 | AVG | 0.00481 | 1.6544 | 0.0000 | 1.40 |
| GROUP | AVG | 0.00472 | 1.6647 | 0.0000 | 1.39 |
| GROUP | RSD | 2.81% | 0.87% | 0.00% | 0.49% |
| LIMITS | MAX | 0.01 | 2.4 | 0.1 | 1.5 |
| LIMITS | MIN | | 1.6 | | 0 |

```
import pandas as pd
from sklearn.ensemble import RandomForestRegressor
from sklearn.model_selection import train_test_split, GridSearchCV
from sklearn.metrics import mean_absolute_error, r2_score

# Step 1: Load and preprocess the data (simulated example)
data = {
    'Temperature': [500, 520, 510, 530, 540, 550, 560, 570, 580, 590],
    'Speed': [5, 5.5, 5.2, 5.8, 6, 6.2, 6.5, 6.8, 7, 7.2],
    'Alloy_Composition': [0.8, 0.82, 0.81, 0.83, 0.85, 0.86, 0.87, 0.88, 0.89, 0.9],
    'Humidity': [30, 32, 31, 33, 35, 36, 37, 38, 39, 40],
    'Quality_Score': [85, 87, 86, 88, 90, 91, 92, 93, 94, 95]
}

# Convert to DataFrame
df = pd.DataFrame(data)

# Step 2: Define features and target
X = df[['Temperature', 'Speed', 'Alloy_Composition', 'Humidity']]
y = df['Quality_Score']

# Step 3: Split the data into training and testing sets
X_train, X_test, y_train, y_test = train_test_split(X, y, test_size=0.2, random_state=42)

# Step 4: Train a Random Forest Regressor
rf = RandomForestRegressor(random_state=42)

# Hyperparameter tuning using GridSearchCV
param_grid = {
    'n_estimators': [50, 100, 200],
    'max_depth': [None, 10, 20],
    'min_samples_split': [2, 5, 10]
}
grid_search = GridSearchCV(estimator=rf, param_grid=param_grid,
                cv=3,
                scoring='neg_mean_absolute_error')
grid_search.fit(X_train, y_train)

# Best model
best_rf = grid_search.best_estimator_
```

Fig. 36 (Continued)

```
# Step 5: Evaluate the model
y_pred = best_rf.predict(X_test)
mae = mean_absolute_error(y_test, y_pred)
r2 = r2_score(y_test, y_pred)

# Feature importance
feature_importances = best_rf.feature_importance_

# Output results
results = {
   'Best Parameters': grid_search.best_params_,
   'Mean Absolute Error':mae,
   'R2 score': r2,
   'Feature Importances': dict(X.columns.tolist(), feature_importances))
}
```

Execution Results Best parameters:
- max_depth: None
- min_samples_split: 2
- n_estimators: 200
- Mean Absolute Error: Appoximately 0.525 [ 0.525 ]
- R2 Score: Apporximately 0.997 [ 0.997 ]
- Feature Importances:
  - Temperature: 26.09% [ 26.09% ]
  - Speed: 26.66% [ 26.66% ]
  - Alloy Composition: 24.37% [ 24.37%]
  - Humidity : 22.88% [ 22.88% ]

Fig. 37

```python
import pandas as pd
from sklearn.ensemble import GradientBoostingRegressor
from sklearn.model_selection import train_test_split, GridSearchCV
from sklearn.metrics import mean_absolute_error, r2_score

# Step 1: Load and preprocess the data (simulated example)
data = {
    'Temperature': [500, 520, 510, 530, 540, 550, 560, 570, 580, 590],
    'Speed': [5, 5.5, 5.2, 5.8, 6, 6.2, 6.5, 6.8, 7, 7.2],
    'Alloy_Composition': [0.8, 0.82, 0.81, 0.83, 0.85, 0.86, 0.87, 0.88, 0.89, 0.9],
    'Humidity': [30, 32, 31, 33, 35, 36, 37, 38, 39, 40],
    'Quality_Score': [85, 87, 86, 88, 90, 91, 92, 93, 94, 95]
}

# Convert to DataFrame
df = pd.DataFrame(data)

# Step 2: Define features and target
X = df[['Temperature', 'Speed', 'Alloy_Composition', 'Humidity']]
y = df['Quality_Score']

# Step 3: Split the data into training and testing sets
X_train, X_test, y_train, y_test = train_test_split(X, y, test_size=0.2, random_state=42)

# Step 4: Train a Gradient Boosting Regressor
gbr = GradientBoostingRegressor(random_state=42)

# Hyperparameter tuning using GridSearchCV
param_grid = {
    'n_estimators': [50, 100],
    'learning_rate': [0.01, 0.1],
    'max_depth': [3, 5],
    'min_samples_split': [2, 5]
}
grid_search = GridSearchCV(estimator=gbr,
                param_grid=param_grid,
                cv=3,
                scoring='neg_mean_absolute_error')
grid_search.fit(X_train, y_train)

# Best model
best_gbr = grid_search.best_estimator_

# Step 5: Evaluate the model
y_pred = best_gbr.predict(X_test)
mae = mean_absolute_error(y_test, y_pred)
r2 = r2_score(y_test, y_pred)
```

Fig. 37 (Continued)

```
# Feature importance
feature_importances = best_gbr.feature_importances_

# Output resuts
results = {
    'Best Parameters': grid_search.best_params_,
    'Mean Absolute Error': mae,
    'R2 Score': r2,
    'Feature Importances': dict(zip(X.columns.tolist(), feature_importances))
}
```

Execution Results
- Best parameters:
  - n_estimators: 100
  - learning_rate: 0.1
  - max_depth: 3
  - min_sample_split: 2
- Mean Absolute Error: Apoximately 0.45 [ 0.45 ]
- R2 Score: Apporximately 0.98 [0.98 ]
- Feature Importances:
  - Temperature: 27% [ 27% ]
  - Speed: 25% [ 25% ]
  - Alloy Composition: 24% [ 24%]
  - Humidity : 24% [ 24% ]

ALUMINUM MANUFACTURING PROCESS WITH RETROACTION LOOP

CROSS-REFERENCES

This application relates to and is a non-provisional application claiming priority under 35 U.S.C. § 119(e) and 37 C.F.R. § 1.78(a) for a priority claim to earlier-filed U.S. provisional patent application Ser. No. 63/616,087, filed 2023 Dec. 29 under 35 U.S.C. § 111, entitled INTELLIGENT ALUMINUM MANUFACTURING PROCESS, and from U.S. provisional patent application Ser. No. 63/616,102, filed 2023 Dec. 29 under 35 U.S.C. § 111, entitled ALUMINUM MANUFACTURING PROCESS WITH RETROACTION LOOP, the specifications of which are hereby incorporated herein by reference in their entireties.

BACKGROUND OF THE INVENTION

1. Field of the Invention

This invention relates generally to computer systems adapted to control and optimize manufacturing operations. The present invention more specifically relates to methods, systems and devices to control and optimize casting of articles of aluminum with machine learning assistance.

2. Description of the Related Art

Over the past several decades, the casting of aluminum has undergone a transformative journey, progressing from traditional mold casting to the widely adopted technique of direct-chill casting. This evolution has been spurred by the ever-increasing demand for aluminum and its alloys across diverse industries. Presently, the state of the art in direct-chill casting represents a sophisticated process. In this contemporary method, as illustrated in FIG. 11, molten aluminum is meticulously poured from a furnace with precision towards a degasser, aimed at removing impurities and enhancing the metal's purity. Following this crucial step, the molten aluminum undergoes a meticulous filtration process to further refine its composition. Subsequently, the refined metal is directed to a direct-chill casting piece of equipment where controlled cooling processes are employed to solidify it into an array of predetermined shapes. The evolution from conventional casting methods to the present direct-chill casting technique signifies a noteworthy advancement in the field of aluminum manufacturing, aligning with the demands of contemporary industrial applications. Still in reference to FIG. 11, the following elements are going to be described in further details.

Furnace (1): There are many furnace configurations but, in this document, only the most common will be described based on metal origin.

Smelter: Usually, the metal comes from the pot operations and the liquid aluminum is transferred into the furnace from crucibles. When the needed quantity is reached, the aluminum is batched to a specific alloy to be cast. Because it comes from the pot operations, the metal shows a high content in alkali metals such as sodium, calcium, and lithium. Some aluminum producers to decrease that alkali content, the molten aluminum is treated in-crucible using a reactions TAC (Treatment In Crucible) unit. The TAC injects a mixture of inert gas (Nitrogen or Argon) along with solid flux mainly containing aluminum fluoride (AlF3). The fluoride reacts with the present alkali metals to decrease them to a lower level as the following:

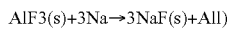

$AlF3(s)+3Na \rightarrow 3NaF(s)+Al(l)$

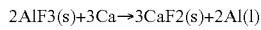

$2AlF3(s)+3Ca \rightarrow 3CaF2(s)+2Al(l)$

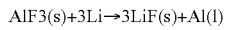

$AlF3(s)+3Li \rightarrow 3LiF(s)+Al(l)$

Furnace

Liquid aluminum either TAC processed or not is poured into the furnace. To decrease the alkalis content to acceptable level, the molten aluminium is treated using a reactions Rotary Gas Injection (RGI)/Rotary Flux Injection (RFI) unit. The RFI unit injects a mixture of inert gas (Nitrogen or Argon) along with either chlorine gas or a solid flux containing magnesium chloride (MgCl2). The chlorine reacts with the present alkali metals to decrease them to an acceptable level as the following:

RGI

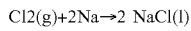

$Cl2(g)+2Na \rightarrow 2\ NaCl(l)$

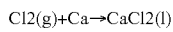

$Cl2(g)+Ca \rightarrow CaCl2(l)$

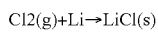

$Cl2(g)+Li \rightarrow LiCl(s)$

RFI

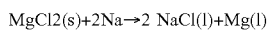

$MgCl2(s)+2Na \rightarrow 2\ NaCl(l)+Mg(l)$

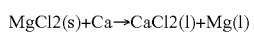

$MgCl2(s)+Ca \rightarrow CaCl2(l)+Mg(l)$

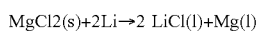

$MgCl2(s)+2Li \rightarrow 2\ LiCl(l)+Mg(l)$

The treatment time is generally around 35-45 minutes and usually occurred after the aluminum alloying process depending on the final desired aluminum alloy. In this case, the furnace is operated independently from the RGI/RFI treatment. The treatment efficiency is measured by taking a small liquid aluminum sample, cast it in a suitable shape to measure the alkali content by Optical Emission Spectrometer (OES). The result is sent back to the operation to start or not the casting process. The alloy content is also verified at the same time. The following descriptions are for exemplary purposes only and do not intend to limit the scope of the present application.

Recycling: The only difference with the smelter is the origin of the liquid metal. It comes from remelt of scrap material made in a specially designed furnace. In term of metal chemistry, the alkali content of recycled metal is a bit different. The sodium and the lithium content are much lower than with the metal coming from the smelting operations. However, the calcium content is higher. The in-furnace metal treatment is the same as the smelter metal.

Launders or troughs (2): The troughs are refractory open shapes to convey molten aluminum between the different in-line pieces of equipment. It must be well insulated and is usually covered to minimize thermal losses. Except for metal level reading at specific critical points, the troughs are not linked to the rest of the piece of equipment. They can be heated or not.

Degasser (3): The degasser is an in-line piece of equipment to get rid of hydrogen dissolved into molten aluminum. The solubility of hydrogen is higher in the liquid phase than in the solid one. If the hydrogen is not removed before solidification, it can caused porosity affecting mechanical properties. The degasser principle consists in submerged rotating heads in which an inert gas is injected. The rotation of the head sheers the gas in very small bubble to increase the contact probability as well as a better dispersion to optimize contact time. The number of rotors is determined by the aluminum flow rate to be treated. There are mainly two types of degassers: the box type which shows one to five deep chambers into which an impeller is delivering the gas/flux mixture, or the other one is a trough type degasser consisting in a slightly wide trough with multiple heads also delivering the gas/flux mixture into the flowing aluminum. The remaining alkali content can be further decreased in the degasser if a small amount of chlorine gas or solid magnesium chloride salt is used along with the inert gas. The alkali content removal follows the chemical equations given above. The presence of chlorine also increases the removal of non-metallic inclusions. The degasser is a stand-alone unit, and it is not linked to the rest of the piece of equipment. To verify its efficiency, a hydrogen measurement apparatus is used to check it. There is no direct interaction between the measurement unit and the degasser. If needed, the degasser parameters are manually adjusted based on the hydrogen measurement results.

Filter (4): The filtration step is ensured by two types of pieces of equipment. A small box containing a flat reticulated filter called Ceramic Foam Filter (CFF) in which the molten aluminum goes through. The very tortuous path filter retains inclusions within its structure showing a cleaner molten aluminum after. The other type is a large box is which a filtration media is mounted. The molten aluminum passes through the deep filtration media which retains inclusions with the same molten metal cleanliness results than a CFF. That piece of equipment is also a stand-alone one and it is not linked to other piece of equipment. The efficiency of filtration is, from time to time, measured using a specific piece of equipment. However, only information delivered by that piece of equipment for measurement is on the efficiency of the filter or on its useful life.

Distribution trough (5): The molten aluminum is now ready to be solidified. The distribution trough function is to distribute the molten aluminum in the right proportion to cast either billets, small ingots or large sheet ingots. The molten metal delivery system usually consists in a level sensor and a distribution system linked to that level sensor. It is not connected to downstream piece of equipment except to the pouring furnace that provides the desired distribution molten aluminium level. However, it is connected to the casting table to ensure an optimum and consistent feed of the molds.

Direct-chill mold table (6): Many variations of this piece of equipment exist depending in which form the molten aluminum must be solidified. The most common ones are small remelt ingots, billets and sheet ingots. The direct-chill solidification of molten aluminum is made using a complex piece of equipment controlled by many variables such as water cooling flow rate, casting speed, molten metal distribution, metal temperature and so on. The control feed-back is limited to this piece of equipment with a possibility of gathering casting data somewhere for future treatment. Except for the needed metal level and flowrate, this piece of equipment is not linked to the downstream piece of equipment.

Ingots (7): As given above, the ingot shape varies depending on the final application. Except for the small remelt ingots, the billets and sheet ingots have to be inspected for surface and internal defects, cracks and overall dimensions such flatness and straightness. These operations are not linked to the rest of the downstream piece of equipment. However, with experienced operators and depending on the type of defects, some feedback control can be done on the downstream piece of equipment to try to correct the problem.

Therefore, it exists a need in the art for an improved casting aluminum process over the existing art. There is a need in the art for an improved aluminum manufacturing process adapted to improve upon collecting and using the process data. There is also a need for an improved aluminum manufacturing process that can be economical while improving the quality of the product. Other deficiencies and opportunities will become apparent to one skilled in the art to which the invention pertains in view of the following summary and detailed description with its appended figures.

SUMMARY OF THE INVENTION

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In some aspects, the techniques described herein relate to aluminum casting process; and use of sensors and feedback analysis process to improve efficacy of casting process and quality of aluminum ingots.

In some aspects, the techniques described herein relate to aluminum casting process; and methods, devices and apparatus used for controlling and optimizing the process of production of articles of aluminum, and/or the sub-processes involved in the production of articles of aluminum.

The invention is generally described as a method, a system, a device and/or a graphical user interface used to produce an article of aluminum, inputting information used to produce an article of aluminum, and/or optimize the production of the article of aluminum.

Aspects of our work provide, in accordance with at least one embodiment thereof, a method and system allowing to use Artificial Intelligent to collect empirical data, and to process the empirical data into an improved method of controlling the production of an article of aluminum, and into automation of the production using the improved method.

One aspect of the instant invention provides, in accordance with at least one embodiment thereof, a method and system allowing to receive at least one parameter to be prioritized in the production of an article of aluminum, to generate operating parameters for the production of the article of aluminum, and to control production equipment using these operating parameters, thereby modifying the production of aluminum according to the prioritized parameter.

In some aspects, the description herein relates to a method of producing an article of aluminum through a series of subsequent phases in which is processed, using production equipment, a volume of aluminum, the method including: having an AI system receiving at least one manufacturing parameter to be optimized for the article or its production; having the AI system processing the at least one to-be-optimized manufacturing parameter and generating at least one operating condition for a first phase among the series of subsequent phases; having the AI system processing the at least one operating condition, and generating at least one AI operating parameter for processing the volume of aluminum using production equipment associated with the first phase; having the production equipment associated with the first phase processing the volume of aluminum according to the at least one AI operating parameter; wherein there is a first operating parameter for obtaining a volume of aluminum having an optimized quality characteristic at the end of the first phase, and wherein having the production equipment associated with the first phase performing the at least one AI operating parameter generates a deviation compared with having the equipment associated with the first phase performing the first operating parameter.

In some aspects, the description herein relates to a method, wherein the volume of aluminum obtained when the production equipment associated with the first phase is performing according to the at least one AI operating parameter has not the optimized quality characteristic.

In some aspects, the description herein relates to a method, wherein processing the wherein the volume of aluminum involves performed physically processing the volume of aluminum, wherein the deviation includes at least a deviation in an amount of physical processing of the volume of aluminum.

In some aspects, the description herein relates to a method, wherein processing the wherein the volume of aluminum involves adding additive to the volume of aluminum, wherein the deviation includes at least a deviation in an amount of additive.

In some aspects, the description herein relates to a method, wherein processing the wherein the volume of aluminum involves heating the volume of aluminum, wherein the deviation includes at least a deviation in energy used for heating the volume of aluminum or time when heating the volume of aluminum.

In some aspects, the description herein relates to a method, wherein processing the wherein the volume of aluminum involves providing a settling period to the volume of aluminum, wherein the deviation includes at least a deviation in the settling period.

In some aspects, the description herein relates to a method, wherein processing the wherein the volume of aluminum involves selecting a mix of raw material of at least two sources to form the volume of aluminum, wherein the deviation includes at least a deviation in a ratio in the mix of raw material of the at least two sources.

In some aspects, the description herein relates to a method, further including having a sensor monitoring the production equipment processing the volume of aluminum, generating monitoring data, and transmitting monitoring data to the AI system, wherein the AI system further generating at least one additional AI operating parameter for a further processing of the volume of aluminum using production equipment associated with a phase subsequent to the first phase.

In some aspects, the description herein relates to a method, further including having a sensor monitoring the production equipment processing the volume of aluminum, generating monitoring data, and transmitting the monitoring data to the AI system, wherein the AI system further processes the monitoring data and refine the process of generating at least one operating condition for the first phase based on the monitoring data.

In some aspects, the description herein relates to a method, further including having another production equipment associated with the second phase, with the other production equipment processing the volume of aluminum according to another AI operating parameter.

In some aspects, the description herein relates to a method, further including having the AI system processing the at least one to-be-optimized manufacturing parameter and generating at least another operating condition for another phase among the series of subsequent phases.

In some aspects, the description herein relates to a method, further including having the AI system processing the at least one other operating condition, and generating at least one AI operating parameter for processing the volume of aluminum using another production equipment associated with the other phase.

In some aspects, the description herein relates to a method, further including having a sensor monitoring the production equipment processing the volume of aluminum, generating monitoring data during the processing of the volume of aluminum, and transmitting the monitoring data to the AI system, and having the AI system generating at least one modified operating condition based on the monitoring data, processing the at least one modified operating condition, and generating at least one AI modified operating parameter for processing the volume of aluminum using production equipment associated with the first phase.

In some aspects, the description herein relates to a method, further including having the production equipment associated with the first phase processing the volume of aluminum according to the at least one AI modified operating parameter.

In some aspects, the description herein relates to a method, including having sensors motoring all phases of the series of subsequent phases, having the sensors transmitting monitoring data to the AI system, and having the AI system refined based on the monitoring data.

In some aspects, the description herein relates to a method, including having the monitoring data divided between a training data set and a validation data set.

In some aspects, the description herein relates to a method, wherein the AI system includes at least one AI agent.

In some aspects, the description herein relates to a method, wherein the AI system includes a general AI agent and at least two associated AI agents, with the two AI agents being associated with at least one distinct phase among the series of subsequent phases.

In some aspects, the description herein relates to a method, wherein the general AI agent is associated with parameters to be optimized when producing the volume of aluminum.

In some aspects, the description herein relates to a method, wherein the general AI processes the at least one to-be-optimized manufacturing parameter and generates the at least one operating condition for the first phase.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

FIG. 4 is a schematical depiction an AI system in accordance with an illustrative embodiment of the present invention;

FIG. 15 is an UML diagram schematically illustrating data exchange between a general AI engine and associated AI engines in accordance with an embodiment;

FIG. 33 is a monitor showing information during a casting process in accordance with an embodiment;

FIG. 34 are exemplary data collected by sensors during processing of aluminum;

FIG. 35 is a flow chart schematically depicting machine-learning steps;

FIG. 36 is an exemplary code of an AI system and result of partial optimization of aluminum processing with a Random Forest Regressor algorithm; and FIG. 37 is another exemplary code of an AI system and result of partial optimization of the aluminum processing with a Gradient Boosting Regression algorithm.

DESCRIPTION OF EMBODIMENT(S) OF THE INVENTION

Figure 1:
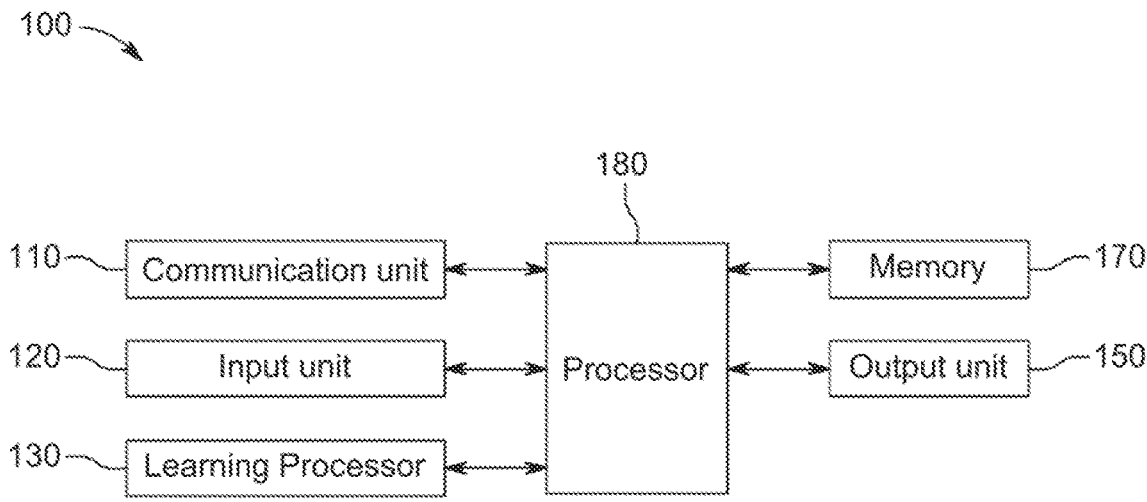
FIG. 1 is a schematical depiction an AI device in accordance with an illustrative embodiment of the present invention.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or, unless otherwise indicated. For example, the phrase "at least one of x, y, or z" means any one of x, y, and z, as well as any combination thereof.

As required, detailed embodiments of the systems, devices, and methods are disclosed herein; however, it is to be understood that the disclosed embodiments are merely exemplary of the systems, devices, and methods, which can be embodied in various forms. Therefore, specific structural and functional details disclosed herein are not to be interpreted as limiting, but merely as exemplary embodiments of at least part of the claims and as a representative basis for teaching one skilled in the art to variously employ the systems, devices, and methods in virtually any appropriately detailed structure. Further, the terms and phrases used herein are not intended to be limiting; but rather, to provide an understandable description of the systems, devices, and methods. While the specification concludes with claims defining the features of the systems, devices, and methods that are regarded as novel, it is believed that the systems, devices, and methods will be better understood from a consideration of the following description in conjunction with the drawing figures, in which like reference numerals are carried forward when most appropriate. When not most appropriate, the same terminology is used for the same component, while the reference numerals are not carried out with following figures.

In the following detailed description, reference is made to the accompanying drawings which form a part hereof, and in which are shown by way of illustration embodiments that may be practiced. It is to be understood that other embodiments may be utilized, and structural or logical changes may be made without departing from the scope. Therefore, the following detailed description is not to be taken in a limiting sense, and the scope of embodiments is further defined by the appended claims.

Alternate embodiments may be devised without departing from the spirit or the scope of the invention. Additionally, well-known elements of exemplary embodiments of the systems, devices, and methods will not be described in detail or will be omitted so as not to obscure the relevant details of the systems, devices, and methods.

Before the systems, devices, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or device that comprises a list of elements does not include only those elements but may include other elements not expressly listed or inherent to such process, method, article, or device. An element proceeded by "comprises . . . a" does not, without more constraints, preclude the existence of additional identical elements in the process, method, article, or device that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", "substantially" or the like, the symbol "~", or the equivalent, when accompanying a numerical value or other information, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

It should further be noted that for purposes of this disclosure, the term "coupled" means the joining of two members directly or indirectly to one another. Such joining, when mechanical, may be stationary in nature or movable in nature. Such joining may be adapted for the flow of fluids, electricity, electrical signals, or other types of signals or communication between two members. Such joining may be achieved with the two recited members, either being integrally formed as a single unitary body with one another or any additional intermediate members participating in the two members being attached to one another. Such joining may be permanent in nature or alternatively may be removable or releasable in nature. The terms "coupled" and "connected," along with their derivatives, may be used. It should be understood that these terms are not intended as synonyms for each other.

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A, or B, or both A and B, which is similar to the phrase "and/or". Where more than two variables are present in such a phrase, this phrase is hereby defined as including any one of the variables, any combination of any of the variables, and all of the variables, for example, a phrase in the form "at least one of A, B, and C" means any one of (A), (B), (C), (A and B), (A and C), (B and C), or (A, B and C).

Relational terms such as "first" and "second", "top" and "bottom", and the like may be used solely to distinguish one entity or action from another entity or action without necessarily requiring or implying any actual such relationship or order between such entities or actions. The description may use perspective-based descriptions such as "up"/"down", "back"/"front", "top"/"bottom", and "proximal"/"distal". Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

In the following description, it is understood that terms such as "first", "second", "top", "bottom", "above", "below", and the like, are words of convenience in an attempt to align the reader in a certain direction and are not to be construed as limiting terms. The terms "top", "up", "upper", "bottom", "lower", "down", "vertical", "horizontal", "interior" and "exterior" and the like are intended to be construed in their normal meaning.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be functionally reasonable or providing a reasonable tolerance for the parts mentioned.

It will be appreciated that embodiments of the systems, devices, and methods described herein may be comprised of one or more conventional processors and unique stored program instructions that control the one or more processors to implement, in conjunction with certain non-processor circuits and other elements, some, most, or all of the functions of the devices and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, devices, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

The following detailed description is presented to enable a person skilled in the art to make and use the systems, devices, and methods of the present disclosure. For purposes of explanation, specific details are set forth to provide an understanding of the present disclosure. However, it will be apparent to one skilled in the art that these specific details are not required to practice the embodiments of the present disclosure. Descriptions of specific applications are provided only as representative examples. Various modifications to the embodiments described herein will be apparent to one skilled in the art, and the general principles defined herein may be applied to other embodiments and applications without departing from the scope of the present disclosure. The present disclosure is not intended to be limited to the embodiments shown but is to be accorded the widest possible scope consistent with the principles and features disclosed herein.

With respect with "artificial intelligence" (AI) systems, an AI system provides a digitally generated, optimized, or adjusted method for executing an activity to meet a condition(s) of a project. Exemplary activities in the field of indiustrial activities include clearing, grading, excavation, drilling foundation, pouring concrete, woodworking, system buildout, melting, pouring, cooling, transporting, melting materials, filtering materials, heating materials, transporting materials, laminating, forging, casting materials, and the like. Exemplary conditions include temperatures, pressure, speeds, time, time/schedule condition(s), budget/cost condition(s), a quality condition, a health condition and the like. The artificial intelligence system is configured to receive inputs in the form of a plurality of input data sets that impact the project. The artificial intelligence system is configured to process input data sets using one or more different ensembles of machine learning models. The artificial intelligence system is configured to general digital models executable to execute in an optimized fashion the method in view of variable conditions to reach the conditions while considering values, weights, preferences, proximity and the like.

For the purpose of the present description, when not specified, "artificial intelligence" and artificial intelligence systems are intended to refer to any one of the following types of artificial intelligence that are:

Neural networks that refers to a machine learning (ML) process, called deep learning, that uses interconnected nodes or neurons in a layered structure that resembles the human brain.

Rule-Based Systems that use predefined rules and logic for decision-making. Examples of such AI may be expert systems like decision trees for medical diagnosis.

Genetic Algorithms (GAs) that refers to evolutionary algorithms inspired by natural selection, and that is most commonly used for optimization problems where traditional methods fail.

Support Vector Machines (SVMs) that refers to supervised learning models for classification and regression, which is effective in high-dimensional spaces.

Bayesian Networks that refers to probabilistic graphical models that represent variables and their dependencies, and that is good for reasoning under uncertainty.

K-Nearest Neighbors (KNN) that is an instance-based learning algorithm, and that is used for classification or regression by comparing data points to their nearest neighbors.

Decision Trees and Random Forests that are tree-structured models for decision-making, which use random forests that are an ensemble of decision trees for better accuracy.

Linear and Logistic Regression that refers to statistical models for regression and binary classification. Such AI is most commonly used for processes such as predicting sales trends or credit default risk.

Reinforcement Learning (without Deep Learning) that refers to agents learn by interacting with an environment and receiving rewards. An example of such as AI is a game-playing AI like early versions of AlphaGo.

Fuzzy Logic that refers to models with uncertainty and imprecision using "degrees of truth."

Markov Models that refer to models using sequential data where the future state depends only on the current state.

Clustering Algorithms that refer to unsupervised learning methods like K-means or hierarchical clustering, which can be used for example for grouping customers based on purchase behavior.

Symbolic AI that uses symbols and logic to represent and solve problems.

For the purpose of the present description, the following terms and definitions are used.

A large language model (LLM) is a type of computational model designed for natural language processing tasks such as language generation. As language models, LLMs acquire these abilities by learning statistical relationships from vast amounts of text during a self-supervised and semi-supervised training process.

A generative pre-trained transformer (GPT) is a type of large language model (LLM) and a prominent framework for generative artificial intelligence. It is an artificial neural network that is used in natural language processing by machines. It is based on the transformer deep learning architecture, pre-trained on large data sets of unlabeled text, and able to generate novel human-like content. As of 2023, most LLMs had these characteristics and are sometimes referred to broadly as GPTs.

LangChain is a software framework that helps facilitate the integration of large language models (LLMs) into applications. As a language model integration framework, LangChain's use-cases largely overlap with those of language models in general, including document analysis and summarization, chatbots, and code analysis. Key Features of LangChain could be separated in categories and sub-categories. 1) Modular Design: a) Prompt Management: Tools for constructing, templating, and optimizing prompts. b) Chains: Sequences of actions where LLMs are combined with other functions (e.g., API calls, database queries, internet access). c) Memory: Frameworks for incorporating short-term and long-term memory into applications, enabling context awareness across conversations. d) Integration: Connects with APIs, databases, and custom functions to process, retrieve, or transform data. e) Supports tools like Python functions, search engines, and document loaders. 2) Document QA and Retrieval: Offers modules for retrieving and querying information from large text corpora or external data sources using vector databases. 3) Versatility: Suitable for tasks such as summarization, question-answering, chatbot development, and more. 4) Customizability: Allows users to fine-tune workflows and incorporate specific logic based on their application needs. LangChain is commonly used with libraries like OpenAI, Hugging Face, or other LLM providers and can be deployed for diverse use cases across industries.

An intelligent agent (IA) can be defined in some instances as an agent that perceives its environment, takes actions autonomously in order to achieve goals, and may improve its performance with learning or acquiring knowledge. An intelligent agent may be simple or complex: A thermostat or other control system is considered an example of an intelligent agent, as is a human being, as is any system that meets the definition, such as a firm, a state, or a biome. An agent has a "condition function" that encapsulates all the IA's goals. Such an agent is designed to create and execute whatever plan will, upon completion, maximize the expected value of the condition function.

Key Characteristics of AI Agents: 1) Perception: Agents receive input from their environment, which could be data, user inputs, or sensor readings. 2) Processing: They analyze the input using algorithms or models to decide on the best course of action. 3) Action: Agents interact with their environment by performing tasks or making changes, often through actuators or commands. 4) Autonomy: Agents operate with a degree of independence, making decisions without requiring constant human intervention. 5) Learning: Many agents incorporate machine learning to improve their decision-making capabilities over time.

Types of AI Agents: 1) Reactive Agents: Respond to current perceptions without storing past states (e.g., simple chatbots). 2) Proactive Agents: Make decisions based on both current and predicted future states (e.g., recommendation systems). 3) Interactive Agents: Engage with users or systems through dialogue and can adapt based on interactions (e.g., conversational AI like ChatGPT). Agents are foundational in AI for tasks ranging from robotics and automation to virtual assistants and decision-making systems.

Retrieval Augmented Generation (RAG) is a technique that grants generative artificial intelligence models information retrieval capabilities. It modifies interactions with a large language model (LLM) so that the model responds to user queries with reference to a specified set of documents, using this information to augment information drawn from its own vast, static training data. This allows LLMs to use domain-specific and/or updated information. Use cases include providing chatbot access to internal company data, giving factual information only from an authoritative source, summarization and reporting and question answering systems.

The realizations will now be described more fully hereinafter with reference to the accompanying figures, in which realizations are illustrated. The foregoing may, however, be embodied in many different forms and should not be construed as limited to the illustrated realizations set forth herein. Our work is now described with reference to the figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate the description of embodiments of the present invention.

Referring to FIG. 1, FIG. 1 illustrates an AI device 100 according to an embodiment of the present invention. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. The AI device 100 may include a communication unit 110, an input unit 120, a learning processor 130, a sensing unit 140, an output unit 150, a memory 170, and a processor 180.

The communication unit 110 is adapted to transmit and receive data to and from external devices such as other AI devices and the AI server 200 (FIG. 2) by using wire/wireless communication technology. For example, the communication unit 110 may transmit and receive sensor information, a user input, a learning model, and a control signal to and from external devices.

The communication technology that may be used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 is adapted to acquire various kinds of data, including model learning data, and operation data. The input unit 120 may include sensor(s), including a camera for inputting a video signal, a microphone for receiving an audio signal, a user input unit for receiving information from a user, etc.

The learning processor 130 is adapted to learn a model using Large Language model (LLM) of e.g., an artificial neural network, by processing learning data. The learned artificial neural network may be referred to as a learning model. The learning model may be considered an inferred result that may be used as a basis for determination to execute operation(s).

The output unit 150 is adapted to transmit an output, e.g., a machine-processable output, a visual output, an auditory output, or a haptic output. The memory 170 is adapted to store data that supports various functions of the AI device 100. For example, the memory 170 may store executable code, input data acquired by the input unit 120, learning data, a learning model, a learning history, and the like. The processor 180 is adapted to execute operations of the AI device 100. The processor 180 may control the components of the AI device 100 to execute the determined operation. To this end, the processor 180 may request, search, receive, or utilize data of the learning processor 130 or the memory 170. The processor 180 may control the components of the AI device 100 to execute operation(s).

Figure 2:
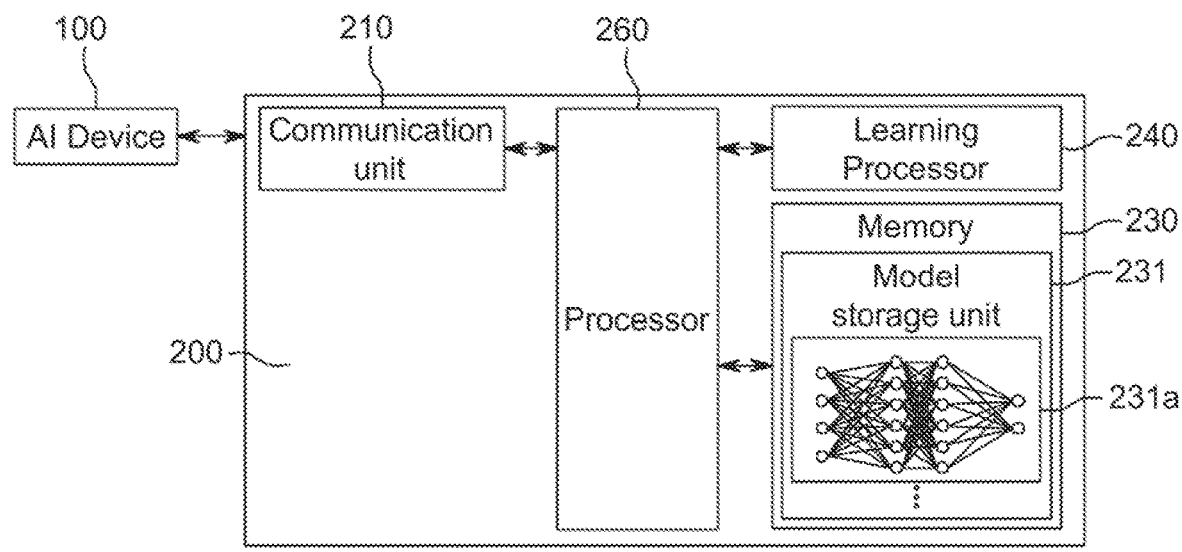
FIG. 2 is a schematical depiction an AI server in accordance with an illustrative embodiment of the present invention.

Referring to FIG. 2, FIG. 2 illustrates an AI server 200 according to an embodiment of the present invention. The AI server 200 may refer to a device that learns e.g., an artificial neural network, by using a machine learning algorithm or uses a learned artificial neural network. The AI server 200 may include one or a plurality of servers to perform distributed processing. The AI server 200 may include a communication unit 210, a memory 230, a learning processor 240, a processor 260, and the like.

The communication unit 210 is adapted to transmit and receive data to and from an external device such as the AI device 100.

The memory 230 may include a model storage unit 231. The model storage unit 231 may store a learning or machine learning model (or e.g., an artificial neural network 231*a*) through the learning processor 240.

The learning processor 240 is adapted to learn the machine learning model 231 by using learning data. The learning model may be implemented in hardware, software, or a combination of hardware and software, with the latter involving executable code stored in memory 230. The processor 260 is adapted to execute operations outside the operations executed by the learning processor 140, including control of components of the AI server 200. According to embodiments, the processor 260 and the learning processor 240 may be distinct or physically integrated into a common processor, sharing or sequencing processing time and capabilities.

Figure 3:
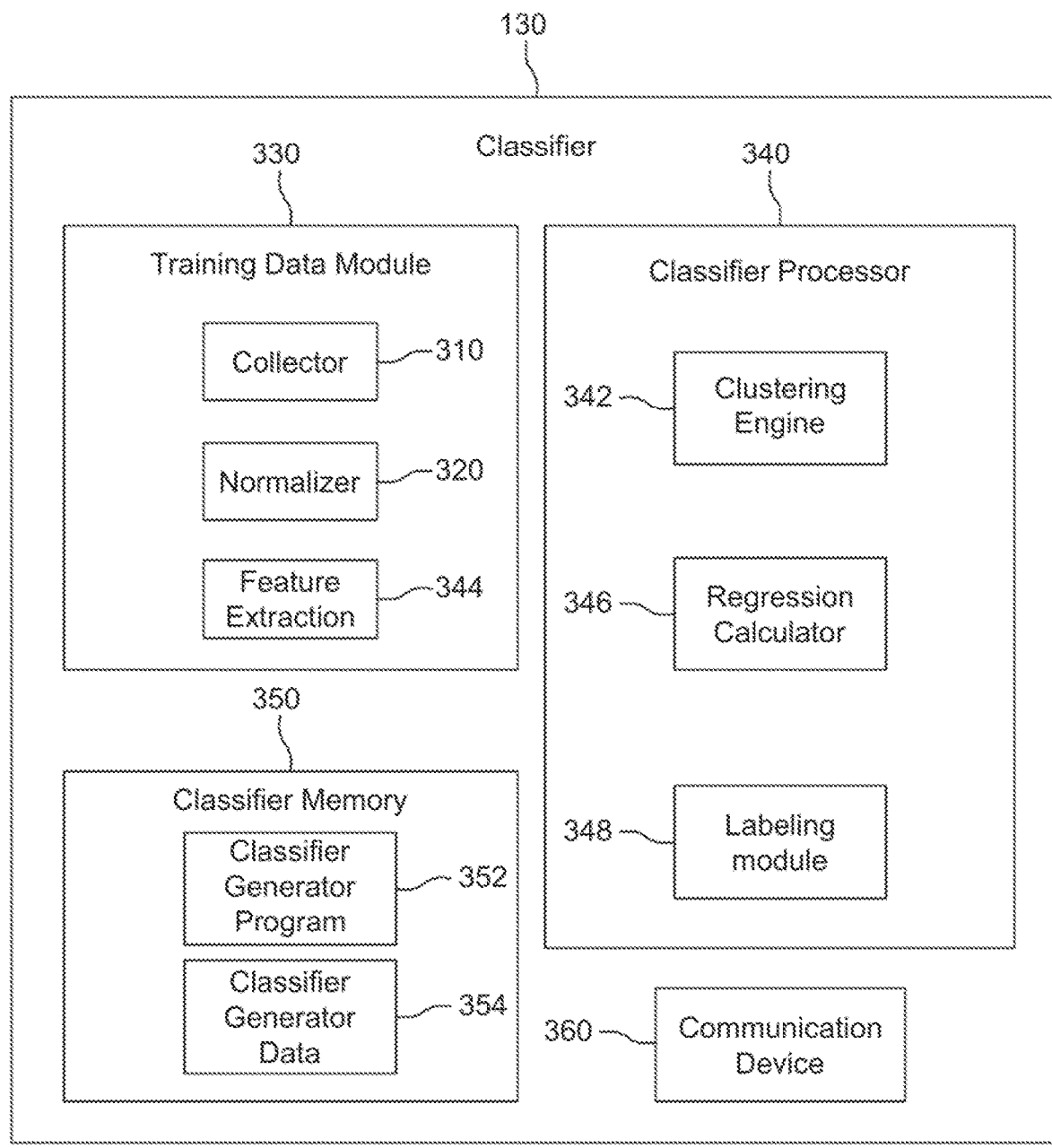
FIG. 3 is a block diagram of an exemplary AI system in accordance with an illustrative embodiment of the present invention.

Referring to FIG. 3, FIG. 3 schematically illustrates a block diagram of an illustrative AI system. AI system 130 may include a training data module 350, a classifier processor 340, a memory 350, and a communication module 360. In some embodiments, AI system 130 may be configured to generate a data to be used as a training data set by model generator. The data module 350 may include a data collector 310, a data normalizer 320, and a feature extraction module 344. The classifier processor 340 may include a clustering engine 342, regression calculator 346, and labeling module 348. The Classifier memory 350 may include one or more storage devices configured to store instructions used by classifier processor 340 to perform functions related to disclosed embodiments. For example, classifier memory 350 may store software instructions, such as classifier program 352, 354 that may perform one or more operations when executed by classifier processor 340.

Referring to FIG. 4 that illustrates an AI system according to an embodiment of the present invention. In the AI system one or more, AI server 410 (depicted as a single one) is in communication through a, e.g., cloud network 400, with a plurality of AI devices 420 involved in the execution of a process. Examples of devices include a computer 413, a sensor 412, a camera 411, robot 420*a*, a self-driving vehicle 420*b*, an XR device 420*c*, a smartphone 420*d*, or a home appliance 420*e*.

It is to be noted that according to the nature of the process to be performed, and specific conditions, the nature and number of AI devices 100 may vary. It is further to be noted that FIG. 4 is a schematic illustration, and AI processing devices should not be considered mandatorily limited to the AI server(s), but may involve e.g., edge AI processing closer to the end AI devices 100.

Figure 5:
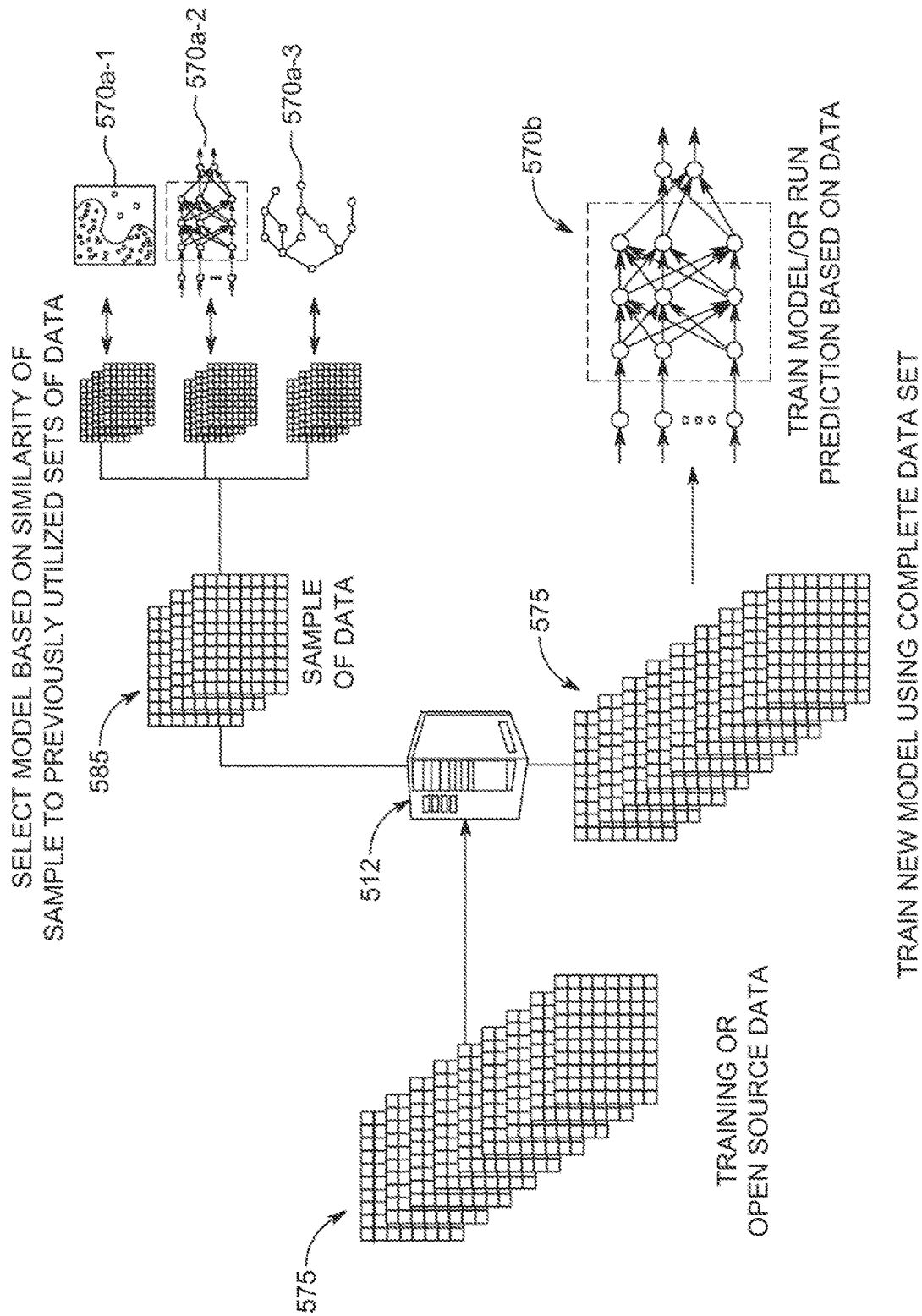
FIG. 5 is a schematical depiction of aspects of one system in accordance with an illustrative embodiment of the present invention.

Referring to FIG. 5, for illustration purpose FIG. 5 provides views of aspects of one exemplary system in accordance with embodiments of the present disclosure. A system includes an AI server 512 or other computer device or machine associated with an artificial intelligence engine. Where the AI server 512 receives data 575 (e.g., training data) from an end user or another source for the purpose of training a machine learning model, a sample 585 of the data 575 may be extracted on any basis and compared to sets of data that were previously utilized to generate or train machine learning models 570*a*-1, 570*a*-2, 570*a*-3. If the sample of the data is sufficiently similar to one of the previously utilized sets of data, then one of the models 570*a*-1, 570*a*-2, 570*a*-3 that was trained using the sufficiently similar one of the sets of data may be selected and provided to an end user for use in performing the task. Alternatively, where none of the sets that was previously used to train one of the models 570*a*-1, 570*a*-2, 570*a*-3 is sufficiently similar to the sample 585, the server 512 may train a machine learning model 570*b* using the data 575 and, upon validating and testing the model 570*b*, distribute the model 570*b* to one or more end users.

Where an artificial intelligence engine trains a machine learning model for the performance of a given task by one or more end users, a baseline machine learning model may be distributed to the end users for use in performing the task. The end users may further continue to refine the trained machine learning model, based on data captured or obtained by any of the end users during the performance of the task. Each of the end users may return data, including e.g., a summary of the differences between their respectively trained models and the baseline model, to the artificial intelligence engine, which may consider such differences, and any newly available data, when training and further updating the baseline model for use in the performance of the given task. Accordingly, machine learning models may be continuously evolving and distributed among connected end users.

Figure 6:
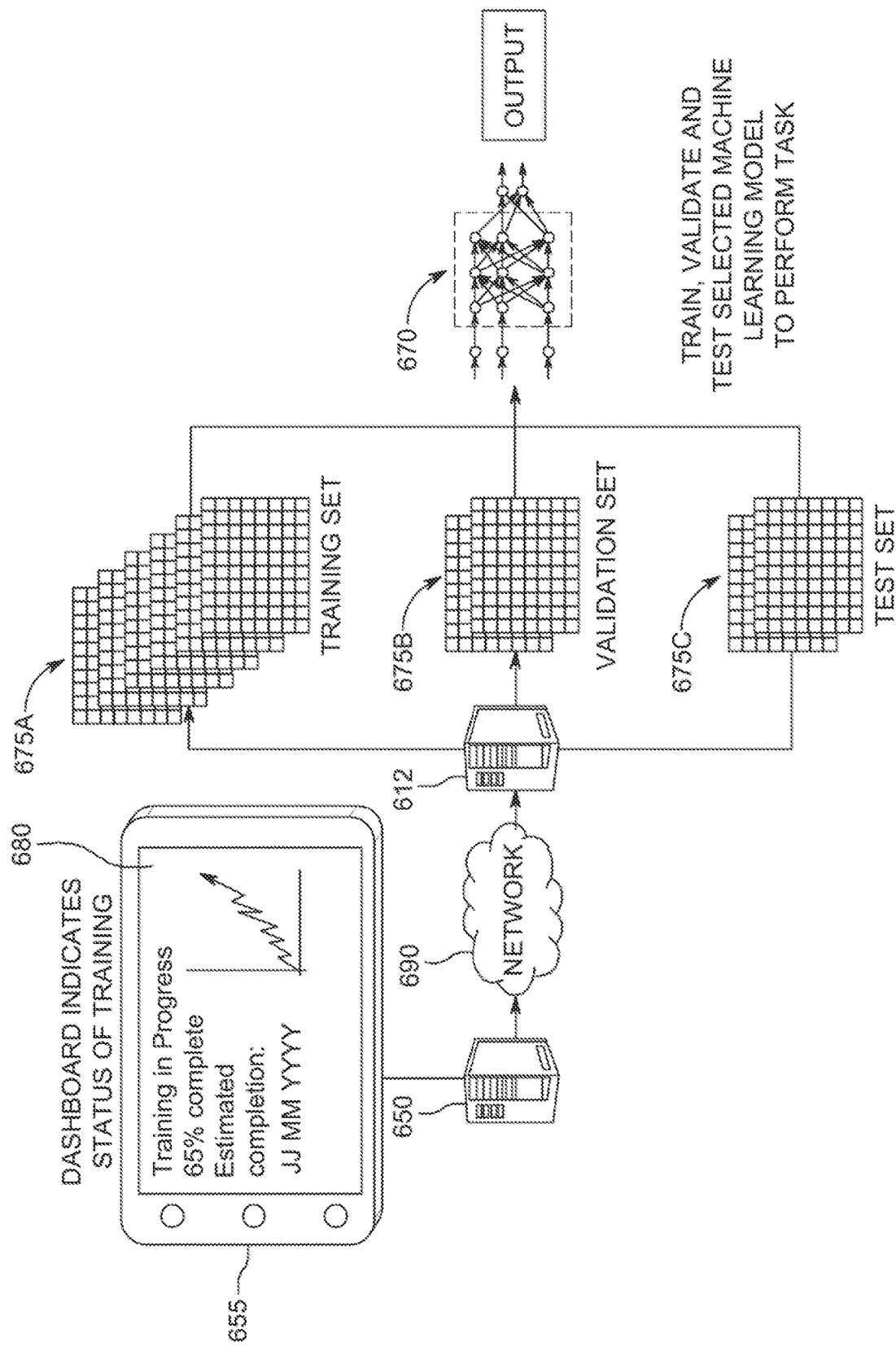
FIG. 6 is a schematical depiction of aspects of one system in accordance with an illustrative embodiment of the present invention.

Referring to FIG. 6, generation and refinement of machine learning models may involve a system that includes a server 612 associated with an artificial intelligence engine or other data processing system. The training data 675 may include any type or form of data (e.g., raw data obtained or generated by the end user, or open source data) for generating a machine learning model for performing a given task, as well as any annotations, labels or other identifiers associated with the performance of the task. The server 612 is configured to receive the training data 675, and to select one of e.g., a plurality of machine learning models 670, for performing the task on any basis. For example, in some embodiments, the server 612 may select one of the machine learning models 670 based on a sample of the training data 675, or the task to be performed, or on any other basis.

A dashboard 680 or other user interface on a device 655 may show information or data regarding a status of a transfer of the training data 675 to the server 612 over the network 690. Upon receiving the training data 675, the server 612 may split or parse the training data 675 into a training set 675A, a validation set 675B and a test set 675C, and uses the respective sets of data 675A, 675B, 675C to train a selected machine learning model 670. For example, the server 612 may provide data points of the data 675A, 675B, 675C to the machine learning model 670 as inputs, and compare outputs received from the machine learning model 670 to annotations, labels or other data associated with the data point. Whether the machine learning model 670 is sufficiently trained may be determined based on a difference between outputs generated in response to the inputs and the annotations, labels or other data. When the machine learning model 670 is complete, the trained model 670 (e.g., a matrix of weights, of correlation factors, or other attributes of layers or neurons of an artificial neural network) may be transmitted to an end server 650 to process data that is specific to the end user during the performance of the task.

A machine learning model may be selected to perform a computer-based task on any basis. For example, where training data is received from an end user for use in training a model to perform a task, and the training data is similar to data that was previously used to train a model, the model that was trained using the similar set of data may be provided to the end user for use in performing the task, and, alternatively or additionally, further trained by the end user.

Figure 7:
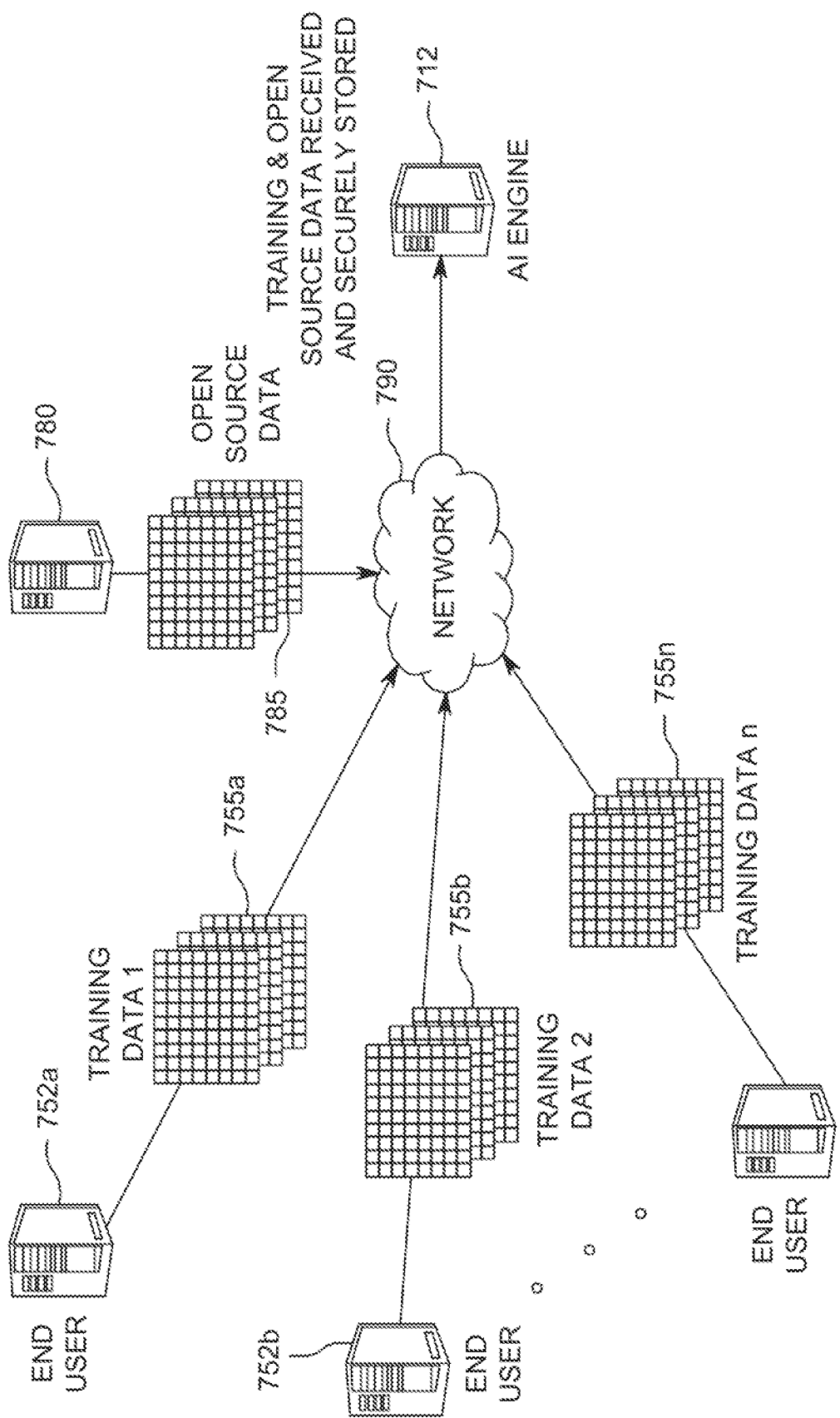
FIG. 7 is a schematical depiction of a system in accordance with an illustrative embodiment of the present invention.

Referring to FIG. 7, FIG. 7 illustrates that the other sources of data of variables sources may be used to improve machine learning models over time. FIG. 7 illustrates that over time data 775 from end users 752 may be transmitted over a network 790 to the server storing an AI Engine 712 and used to validate and improve the machine learning models, as data 785 from third-party 780 such as studies and tests.

Figure 8:
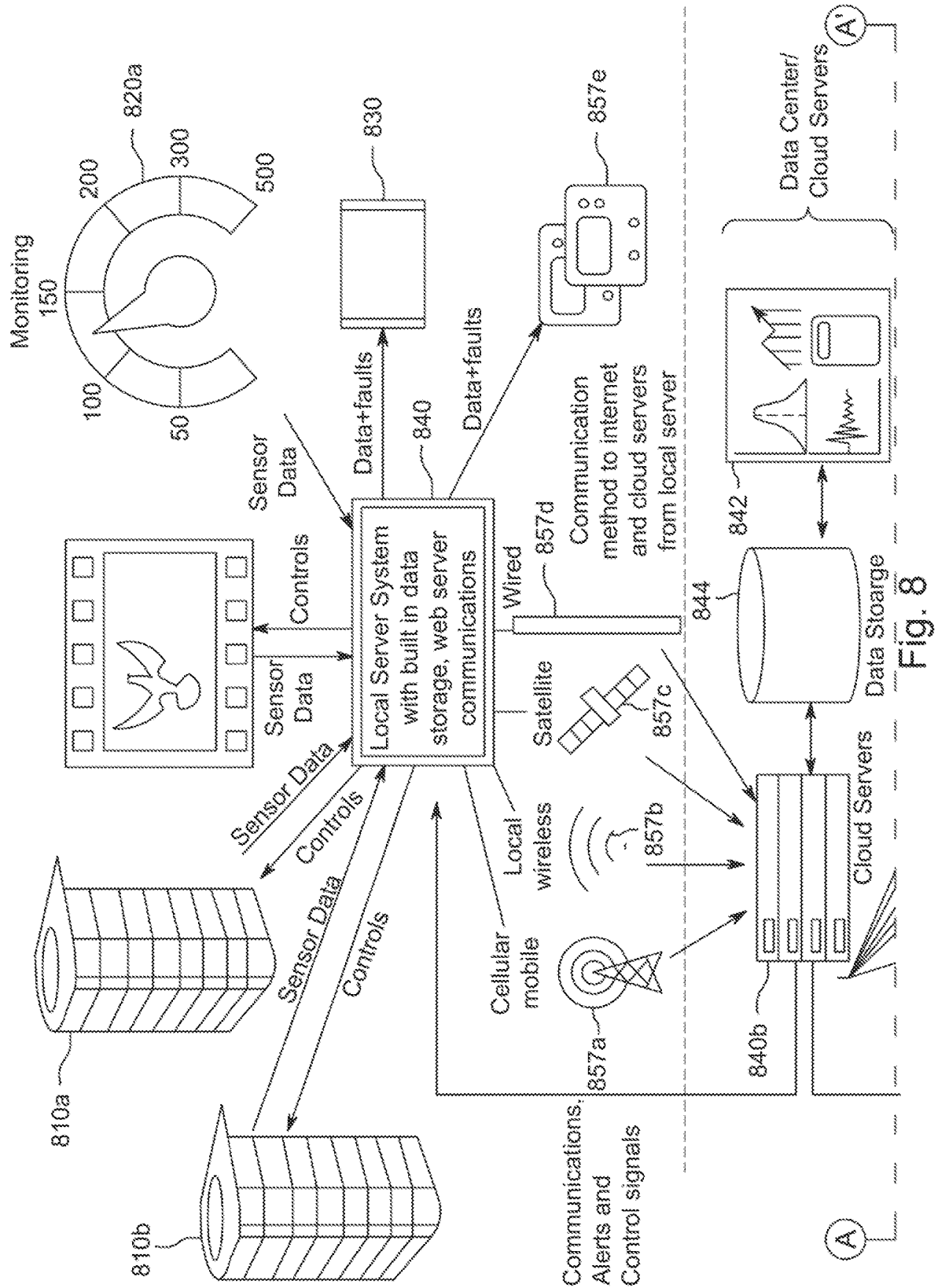
FIG. 8 is an illustrative of an ecosystem including an AI system in accordance with an illustrative embodiment of the present invention.
Figure 8:
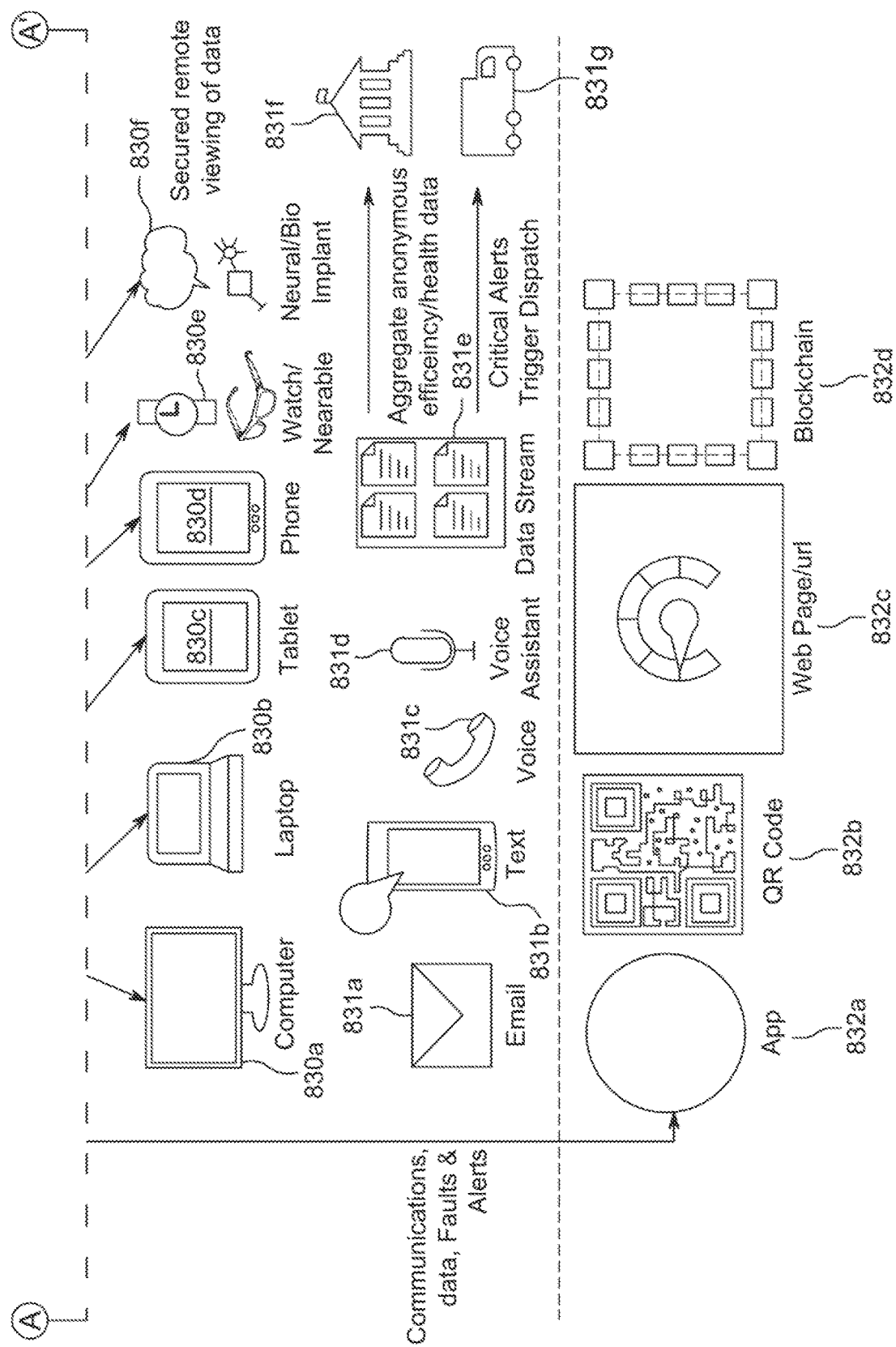

Referring to FIG. 8 that illustrates an ecosystem that may include a local server 840a, one or more operating units 810a, 810b potentially of different types, sensors 850a monitoring unit 820a, a computing device 830a, sensors 857e, communication hubs 857a-d to connect to a cloud server 840b comprising or connected to a file storage 844 and an analytic module 842. The illustrative ecosystem may comprise client computing devices 830a-f, and communication modes 831a-f such as emails and SMSs. The illustrative ecosystem may comprise other mode of fault transmission and correction such as apps 832a, QR code 832b, web page 832c, and blockchain 832d.

Figure 9:
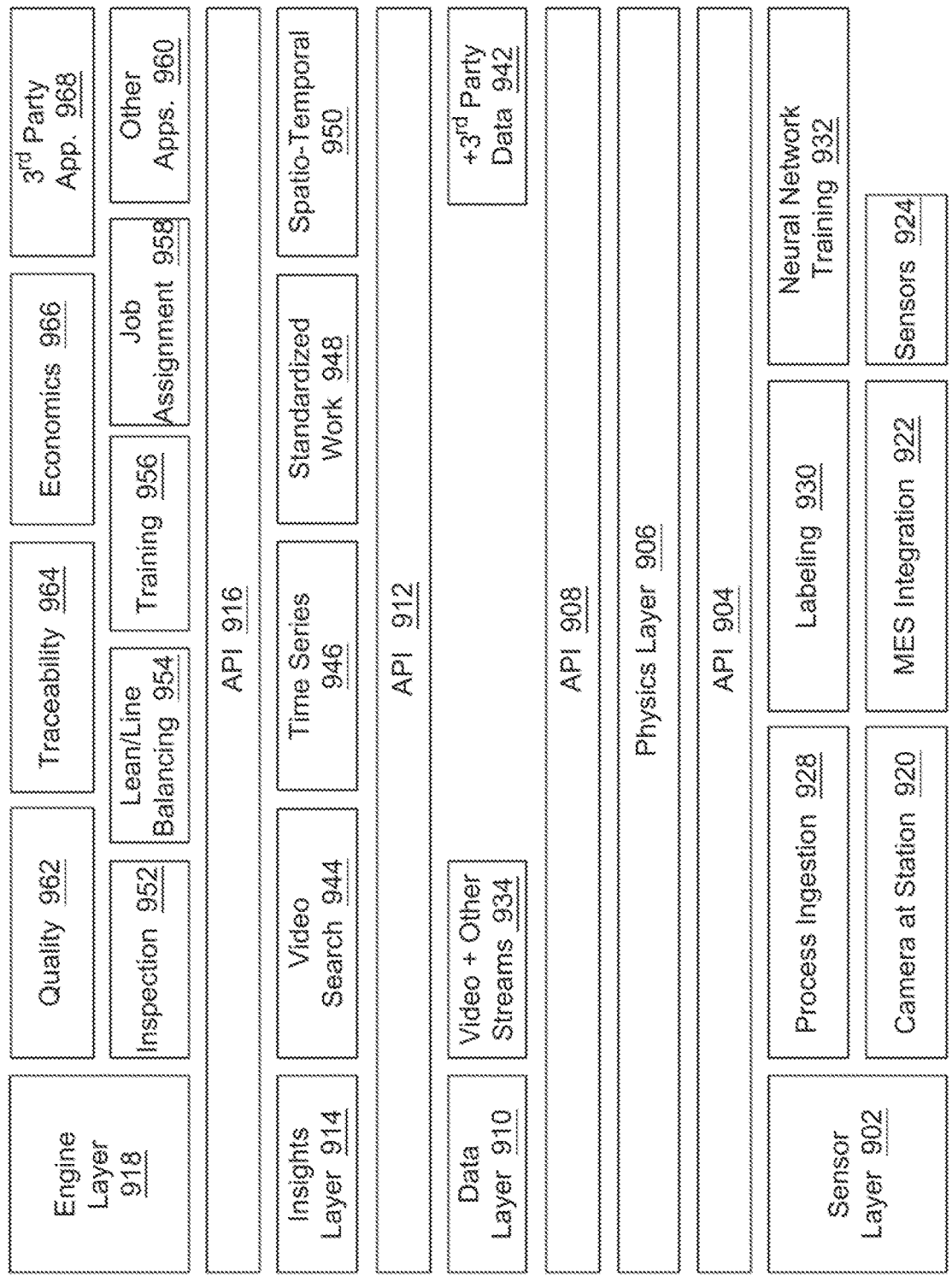
FIG. 9 is a black diagram depicting a layered depiction of an AI system in accordance with an illustrative embodiment of the present invention.

Referring to FIG. 9, FIG. 9 schematically illustrates division of an illustrative system into layers, may comprise a plurality of sensor layers 902, a first Application Programming Interface (API) 904, a physics layer 906, a second API 908, a plurality of data 910, a third API 912, a plurality of insights 914, a fourth API 916 and a plurality of engine layers 918. The sensor layer 902 can include, for example, cameras 920, Manufacturing integration systems (MES) 922, sensors 924, process ingestion 928, labeling 930, neural network training 932 and or the like. The physics layer 906 captures data from the sensor layer 902 to passes it to the data layer 910. The data layer 910, can include but not limited to, video and other streams 934, and third-party data 942. The insights layer 914 can provide for search 944, time series data 946, standardized work 948, and spatio-temporal 950. The engine layer 918 can be utilized for inspection 952, lean/line balancing 954, training 956, job assignment 958, other applications 960, quality 963, traceability 964, economics 966, and third party applications 968 for examples.

Figure 10:
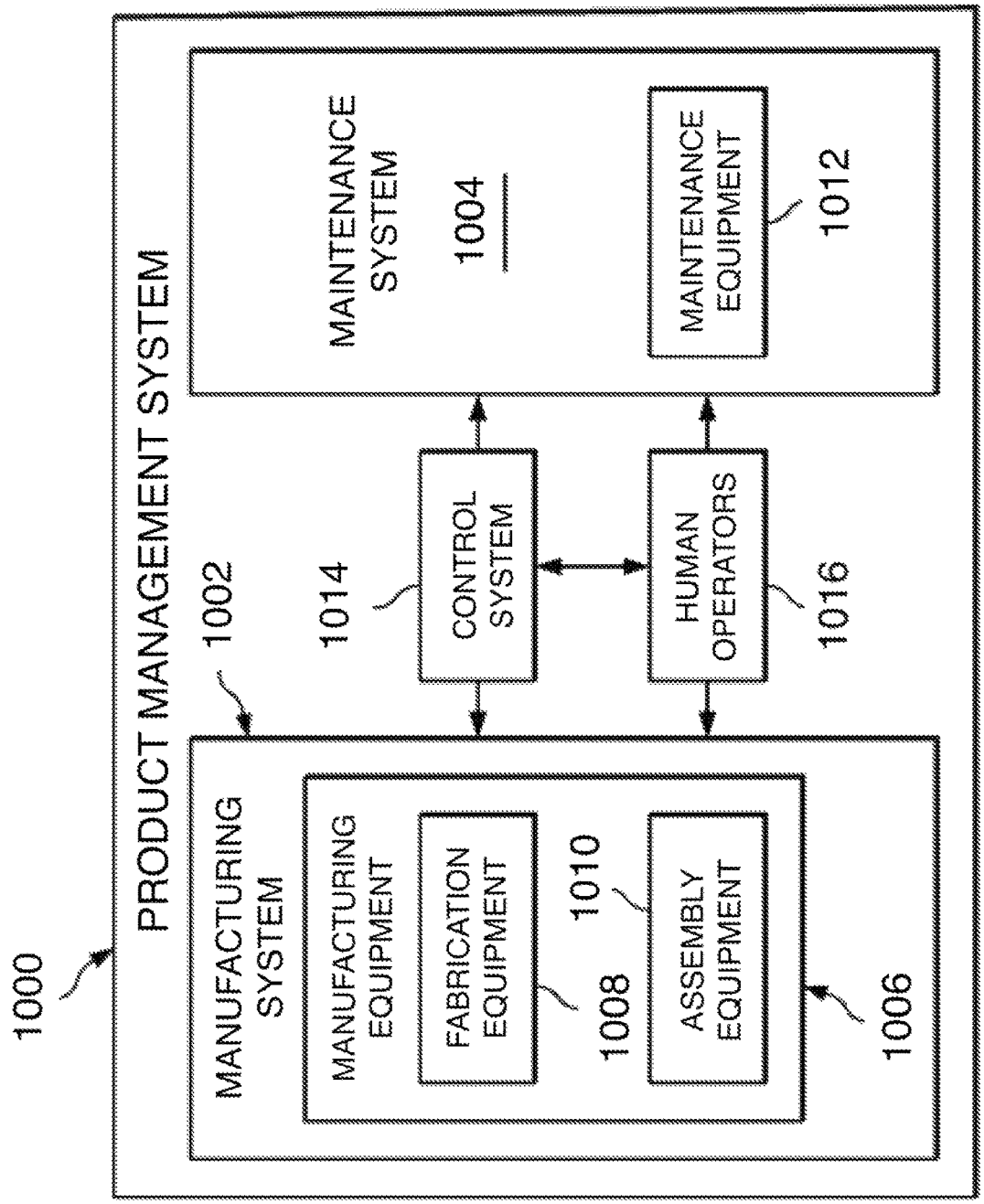
FIG. 10 is a block diagram of a product management system in accordance with an illustrative embodiment of the present invention.
Figure 11:
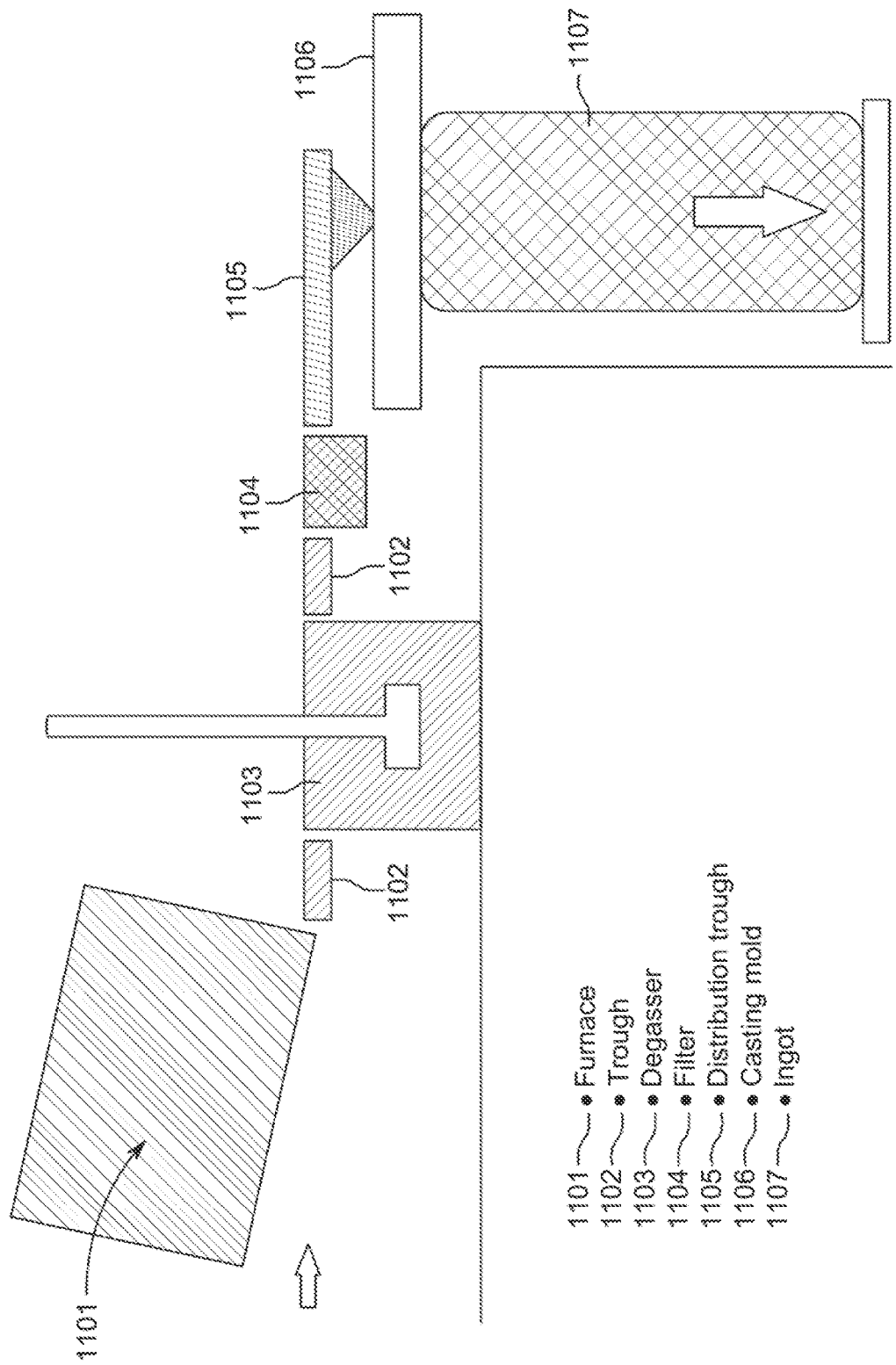
FIG. 11 is a schematic of production of an article of aluminum consisting in an ingot in accordance with the PRIOR ART.

Referring to FIG. 10, FIG. 10 is a block diagram of a general product management system. Product management system 1000 is a physical hardware system. In this illustrative example, product management system 1000 includes at least one of manufacturing system 1002 or maintenance system 1004. Manufacturing system 1002 is configured to manufacture products, such as aircraft. As depicted, manufacturing system 1002 includes manufacturing equipment 1006. Manufacturing equipment 1006 includes at least one of fabrication equipment 1008 or assembly equipment 1010. Fabrication equipment 1008 is equipment that is used to fabricate an article or components of an article. For example, fabrication equipment 1008 can include machines and tools. Examples of tools include a drill, a hydraulic press, a furnace, a mold, a composite tape laying machine, a vacuum system, a lathe, or other suitable types of equipment. Fabrication equipment 1008 can be used to fabricate e.g., metal parts, composite parts, semiconductors, circuits, fasteners, ribs, skin panels, spars, antennas, or other suitable types of parts. Assembly equipment 1010 is equipment used to assemble parts to form an assembled article. Assembly equipment 1010 also can include machines and tools. Examples of machines and tools comprise a robotic arm, a crawler, a faster installation system, a rail-based drilling system, or a robot.

In this illustrative example, maintenance system 1004 includes maintenance equipment 1012. Maintenance equipment 1012 can include any equipment needed to perform maintenance operations. Maintenance equipment 1012 may include tools for performing different operations which can include at least one of disassembling parts, refurbishing parts, inspecting parts, reworking parts, manufacturing replacement parts, or other operations for performing maintenance operations. These operations can be for routine maintenance, inspections, upgrades, refurbishment, or other types of maintenance operations.

Additional maintenance equipment 1012 may include ultrasonic inspection devices, x-ray imaging systems, vision systems, drills, crawlers, and other suitable devices. In some cases, maintenance equipment 1012 can include fabrication equipment 1008, assembly equipment 1010, or both to produce and assemble parts that needed for maintenance.

Product management system 1000 also includes control system 1014. Control system 1014 is a hardware system and may also include software or other types of components. Control system 1014 is configured to control the operation of at least one of manufacturing system 1002 or maintenance system 1004. In particular, control system 1014 can control the operation of at least one of fabrication equipment 1008, assembly equipment 1010, or maintenance equipment 1012.

The hardware in control system 1014 can be implemented using hardware that may include computers, circuits, networks, and other types of equipment. The control may take the form of direct control of manufacturing equipment 1006. For example, robots, computer-controlled machines, and other equipment can be controlled by control system 1014. In other illustrative examples, control system 1014 can manage operations performed by human operators 1016 in manufacturing or performing maintenance operations. For example, control system 1014 can assign tasks, provide instructions, display models, or perform other operations to manage operations performed by human operators 1016.

The disclosure is generally directed to a machine-learning artificial intelligence system for optimizing a manufacturing process, and more particularly manufacturing aluminum article production from raw material. The artificial intelligence system allows to improve the quality of the produced article, and/or aspects relative to the production itself such as costs savings, the energy consumption, the lifespan of tools and components, the input materials, the quality of articles, the production of rejects such as gas emission, etc. The artificial intelligence system additionally may generate graphical user interfaces (GUI) displaying monitoring and operational information and may generate augmented reality GUIs. In some embodiments, the artificial intelligence system may comprise specialized software to efficiently conduct filtering, sorting, and parallel calculation tasks that improve computing time.

Moreover, the disclosure is directed to a hierarchically structure of AI engines associated to the general process or sub-processes. The general AI agent is associated to a management at a macro-level of the process, and the associated AI agents are associated to steps or sub-processes having an initiation state and the controllable end product. With such a structure of the AI agents, the system through the associated AI agents that all processes are respective of the limitations of the tools and materials involved, and that the general process is swayed towards the desired optimization.

Figure 12:
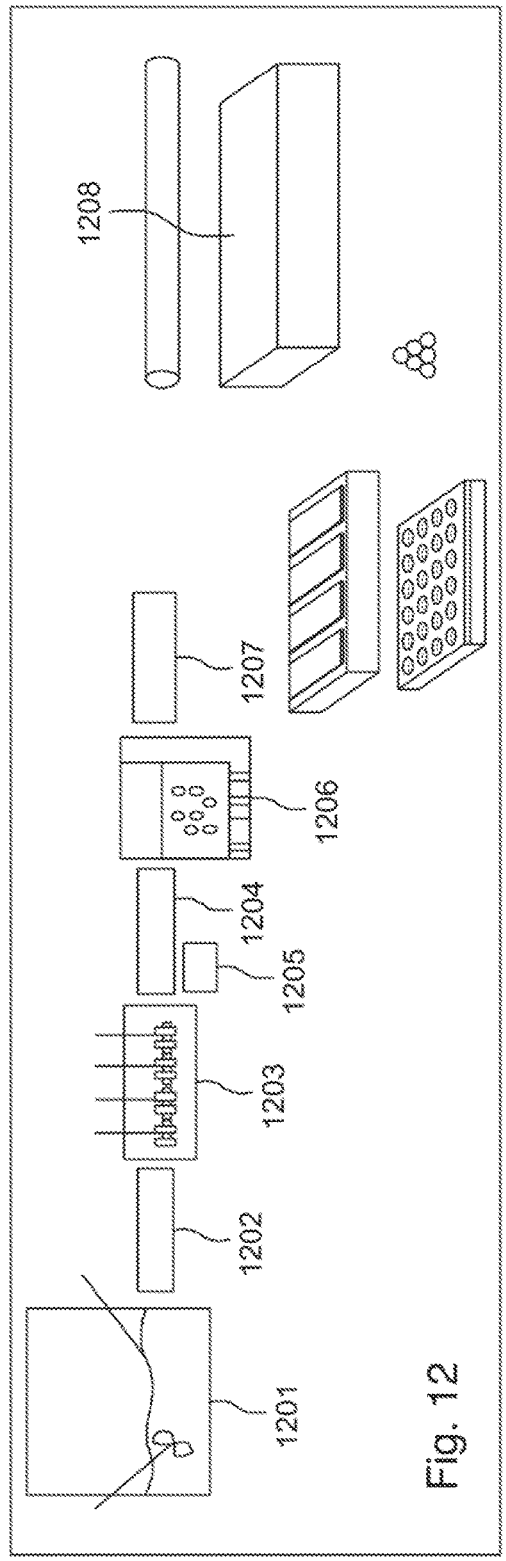
FIG. 12 is a schematic of production of an article of aluminum consisting in an ingot in accordance with an embodiment.

Referring to FIG. 12, FIG. 12 illustrates an improved Aluminum Cast House Retroactive-Interconnected Operating System (ACHROIS) of the present description improves quality and efficacy through a) improved processes control and quality control of the distinct processes taking part in aluminum casting; and b) linking of the process control and quality control process of at least some of the processes through an overall process and quality control process. Implementation of these methods will become more clearer in view of the following description of some of the pieces of equipment used in order to perform the processes.

Furnace 1201: Furnace has sensors associated therewith. Examples of sensors associated with the furnace 1201 and its associated process comprise:

A LIBS unit (Laser Induced Breakdown Spectroscopy unit) for the RGI/RFI treatment. The LIBS unit is used to control the RGI/RGI efficiency but also the chemical alloy analysis of the furnace bath. It cuts the response time of the actual technique and increases the furnace productivity.

An intelligent thermocouple (ITC) consisting of a thermocouple mounted on a motorized movable ramp such that is moved inside and outside the furnace 1201. Since the molten bath has a tendency to show temperature stratification, the ITC is used to measured bath temperature at difference depths to minimized overheating and dross generation.

Gathered data are used to modulate controls of the furnace, e.g., upstream flow, downstream flow, heating, etc.

Trough 1202: The trough 1202 between the furnace 1201 and the degasser 1203 is heated to maintain the metal temperature constant and to avoid thermal losses. Examples of sensors associated with the trough 1202 and its associated process comprise:

A thermal sensor use used to measure temperature of the through when metal is flowing.

A metal level sensor is used to the pouring furnace 1201 to maintain consistent metal level in the trough 1202 minimizing oxide attachments on the walls of the trough 1202 and easing the cleaning and maintenance of the trough 1202.

A hydrogen measurement unit that is located into that trough 1202 close to the entrance of the degasser 1203. The hydrogen measure is used to measure the initial hydrogen level of the aluminum in a continuous fashion during the cast.

Gathered data are used to modulate controls e.g. different gates to automate the molten aluminum flow to the casting pit. The slope of the trough length may be modulated to minimize skull generation of solidified aluminum into it.

Degasser 1203: The degasser 1203 is heated to avoid metal temperature losses. Speed of the rotor(s) of the degasser 1203 as well as gas flow rate are adjustable.

Examples of sensors associated with the degasser 1203 and its associated process comprise:

A metal level laser scanning the surface of the degasser 1203.

Gathered data are used to modulate controls, e.g., heater operations, rotor speed, and gas flow.

Grain refiner unit 1204: A grain refiner unit 1204 adds the refining rod just after the degasser 1203. The distance between the injection point and the filtration unit is long enough to achieve complete grain refiner dissolution. Examples of sensors associated with the Grain refiner unit 1204 and its associated process comprise:

Optical sensor for validating complete dissolution of the grain refiner material.

Gathered data are used to modulate controls, e.g., upstream and downstream gates.

Trough 1205: The trough 1205 between the degasser 1203 and the filter 1206 is also heated to minimize heat losses with the same benefits as previously explained with trough 1202. Examples of sensors associated with the trough 1205 and its associated process comprise:

A hydrogen measurement unit located after the degasser 1203. This unit measures the hydrogen in continuous fashion.

A LIBS unit located in the trough 1205 that measures the chemical composition of the metal.

An inclusion measurement unit that continuously measures the inclusion levels in the molten aluminum flow.

Gathered data are used to modulate controls. A first control consists in controlling injection of chlorine gas or of magnesium chloride flux to get alkali metals at a desired level. Another control consists in modulating heating. Another control consists in controlling upstream gates and downstream gates to control flow. Another control consists in modulating gas flow and rotor speed.

Filter 1206: The filter 1206 is properly heated to maintain metal temperature and optimal filtration efficiency. If a CFF is used, the priming is done automatically. With a CFF, a draining point is needed, and it should be after the CFF bowl. If a Deep Bed Filtration (DBF) is used, the metal is maintained liquid in the filter until the next cast. Oppositely to a CFF, a DBF can be used up to a tonnage determined (For example ranging from 3000-5000 tons) by an inclusion measurement device close to the exit of the filter, that measures the inclusion levels to verify the filtration efficiency. Examples of sensors associated with the degasser 1203 and its associated process comprise:

Temperature sensor sensing temperature of molten aluminum during the filtering process.

Gathered data are used to modulate controls, e.g., heating operations, upstream gates and downstream gates.

Distribution through 1207 is similar in structure and operation to the trough 1202 and trough 1205. Examples of sensors associated with the trough 1207 and its associated process comprise:

An inclusion measurement device, close to the exit of the filter, that measures the inclusion levels to verify the filtration efficiency.

Gathered data used to modulate controls, e.g., flow control components such as gates and magnetic loop flow control, heating controls.

An exemplary condition is to reach an aluminum distribution system used for sheet ingot casting that is completely underpour, minimizing oxide and turbulence generations. An associated condition is to allow the removal of the skim dam, that is an oval refractory shape close to the mold walls into the mold, which in the PRIOR ART has a role of collecting oxides generated by the distribution system. The outcome of the achievement of that condition is a simplification of the operations and a reduction of the costs.

Direct-chill casting table 1208: Examples of sensors associated with the direct-chill casting table 1208 and its associated process comprise:

High resolution cameras around the pit used to detect possible defects.

Water temperature and flow rate can be modulated to achieve the final ingot specifications. Water chemistry is also monitored to maintain its quenchability cast after cast.

If continuous mold lubrification is used, it is monitored to avoid ingot surface defect and to minimize oil mixing with cooling water.

Casting speed i.e. descent dropping speed is controlled to minimize butt curl, cooling transition and so on.

Gathered data are used to modulate controls, e.g., upstream gates.

At the end of the processes is the quality inspection that involves inspection tools: A fully automatic system inspects billets and sheet ingots for surface defects, such as cracks, oxide patches and so on as well as for dimensions, flatness and straightness. Examples of sensors associated with the quality inspection process comprise:

Optical sensors. An ultrasound system that is used to detect internal defects. Gathered data used to modulate controls, e.g., post-processing of ingots, determination of rejects.

It is therefore contemplated therethrough and illustrated through the description that that the present improved Aluminum Cast House Retroactive-Interconnected Operating System (ACHRIOS) features a plurality of pieces of equipment (pieces of equipment 1201 to 1208 and associated sensors) associated to processes participating in manufacturing articles of aluminum such as billets and ingots. It is further demonstrated that the processes are sequential, with the product provided by a piece of equipment at the end of the process affecting the subsequent process, and the whole process as well. It is further known that some conditions (e.g., ambient temperature, ambient humidity, geometry of pieces of equipment) are influencing one or more of the processes, and that the precise influence of these conditions are not well known but rather an empiric knowledge difficult to apply efficiently and to teach. There is therefore a need for the present ACHRIOS that provides a way to store and compile such empirical knowledge and apply the empirical knowledge into an improved process of manufacturing articles of aluminum. The ACHRIOS consists in a system comprising AI agents developed with the described machine learning method, and structured accordingly to the structure described hereinafter.

According to an exemplary embodiment of an ACHRIOS, AI agents are used to control and optimize processing of aluminum. AI agents are also gathering data usable for continuous improvements of the AI agents. Therefore, processes, rather than being considered independently, are considered as an optimizable chain. Technical challenge arises therefrom in at least some modules requiring to be considered globally rather than independently for processing in the ACHRIOS which goes beyond the common use of e.g., PLC controls of the OEM equipment.

According to an exemplary embodiment, the ACHRIOS results from a training of an AI model wherein the AI model is trained for a multi-regression type between phases of processing and considerations regarding the whole processing of the aluminum between the raw material and the finish article (e.g. billet, ingot). The training is performed over data with neural networks adapted for non-linear relationships between empirical training data collected by sensors (example depicted through graphs integrated herein), and known models (such as chemical reactions listed in the instant description). Such model is able to generate relationships unknown when considering independently the processing phases, or a single or limited number of quality indicator(s) such as the percentage of Hydrogen in the aluminum.

Referring to FIG. 36, it illustrates an algorithm for training a machine learning model to predict the quality of aluminum extrusions based on various input parameters. This example uses the Random Forest Regressor algorithm and includes steps for data preprocessing, model training, hyperparameter tuning, and evaluation. The exemplary model is further run and provides exemplary results when trained with partial data.

Referring to FIG. 37, it illustrates an algorithm for predicting the quality of aluminum extrusions using Gradient Boosting Regression. This algorithm is known for its efficiency and accuracy in handling complex relationships in data. The exemplary model is further run and provides exemplary results when trained with partial data.

Figure 13:
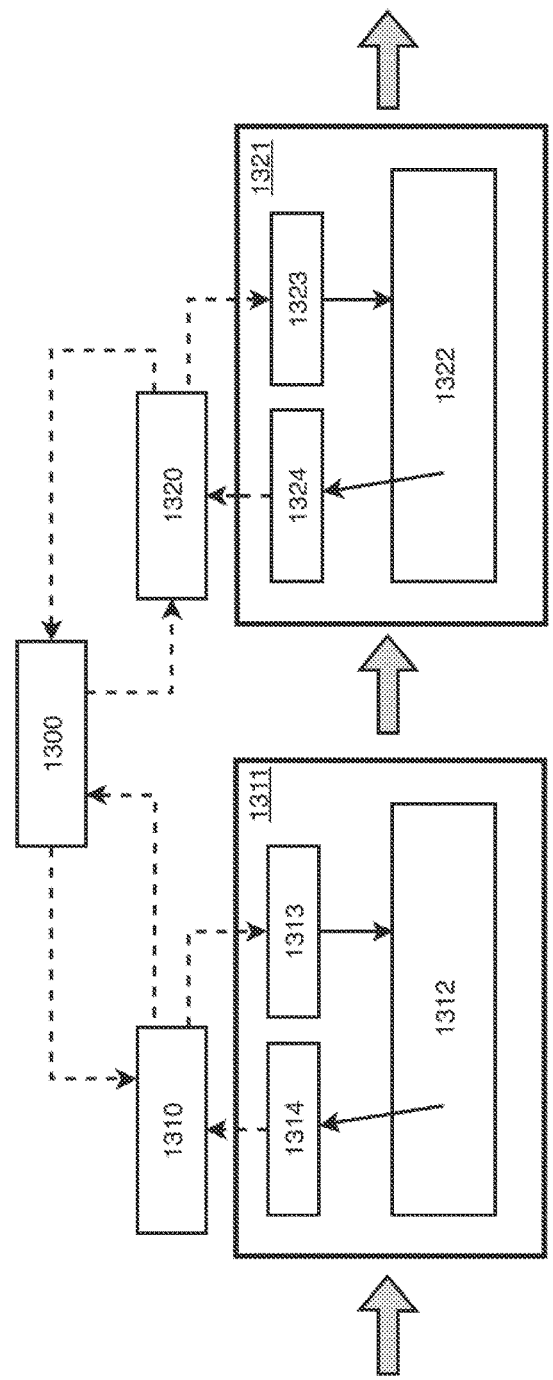
FIG. 13 is a block diagram schematically depicting a portion of an ACHRIOS in accordance with an embodiment.

Referring to FIG. 13, FIG. 13 depicts a portion of an ACHRIOS comprising a plurality of metal processing phases or modules (with only two illustrated), with module 1321 comprising production equipment 1322 associated to production, e.g., a filter; controllable accessory equipment 1323, e.g. heater, motor, influencing the operation of the production equipment 1322; and sensors 1324 monitoring the state and condition of the aluminum at the entry of the production equipment 133, in the production equipment 1322 and/or at the exit of the production equipment 1322. Accordingly, the sensors 1324 at monitoring directly or indirectly the process taking place in or with the production equipment 1322. Furthermore (not depicted), sensors 1322 may also monitor the accessory equipment 1322. Associated AI agent 1320 receives signals from sensors 1324 and generates an associated (first-degree) feedback loop in the form of signals/commands to send to, modify and modulate operation of the controllable equipment 1323. An upstream module 1321, associated to the preceding process in the chain of processes, similarly comprises casting equipment 1312, accessory equipment 1313 and sensors 1314. Associated AI agent 1310 is generating and sending a general (second-degree) feedback loop to the associated AI agent 1320 via the general AI agent 1300 (in communication to a plurality, preferably all, associated AI agents, wherein the general AI agent 1300 is associated to the monitoring and optimization of the whole process.

Figure 14:
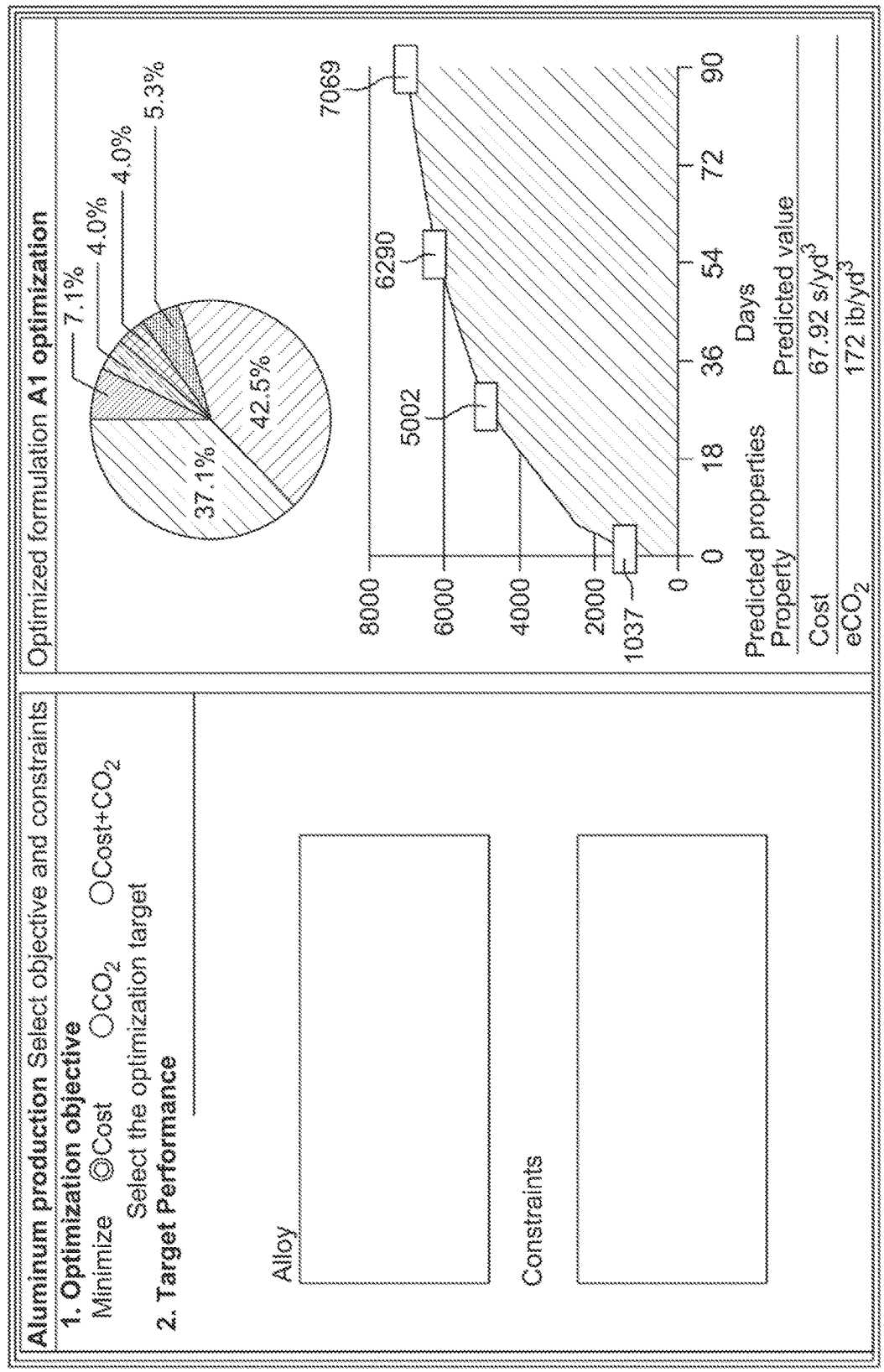
FIG. 14 is a schematic representation of an operating User Interface in accordance with an embodiment.

Referring to FIG. 14 and FIG. 15, FIG. 14 illustrates an operating User Interface 1400 for interacting with the general AI agent 1500 during the setup phase 1590 of the manufacturing process, for controlling production and entering modifying conditions of productions. FIG. 15 schematically illustrates data exchange between the general AI engine 1500 and associated AI engines 1510-1 to 1510-n. It is worth noting that some conditions settable during the setup phase 1590 using the User Interface 1400 are global conditions or parameters, hereinafter generally called global parameters 1521, such as minimizing costs, minimizing $CO_2$ generation, optimizing quality parameter(s), minimizing processing time and to-be-achieved conditions such as minimal quality parameters. During the setup phase 1590, the general AI engine 1500 considers the global parameters 1521, and generates and transmits process-specific parameters 1523 (or conditions) to the associated AI engines 1510-1 to 1510-n.

Further, the User Interface 1400 allows to set process-specific parameters 1522, such as maximizing or a minimum percentage of recycled aluminum to take part, and constraints e.g., associated with equipment. These process-specific parameters 1522 are also considered during the process of determining the optimal method of achieving the global parameters 1521. These are transmitted to appropriate AI Engines 1510 based on which process it pertains to.

Once the setup phase 1590 completed and a first processing phase 1591-1 may begin, operating associated AI engines 1510 communicates data to the general AI engine 1500, which processes them and transmits data to e.g., subsequent AI engine 1510-i to updates the method of processing the aluminum if difference occurs between e.g., the state of aluminum projected to enter and the state of aluminum resulting from the preceding process. It is without saying that all along the different production phases 1591-1 to 1591-n, data are exchanged between the general AI engine 1500 and the associated AI engines 1510 for responding to any gap between the predicted process and the real processing.

Referring now to the Table 1, Table 1 shows an exemplary ACHRIOS with a number of phases including phase 0 being the setup phase, and phases 1 to 10 being associated processes. For each of the phases, Table 1 provides a label of the process; associated conditions of the process; methods and equipment participating in performing the process; nature of sensors that may be used to monitor the process; the nature of the data collected from the process that may be evaluated in order to monitor the process and/or evaluate the outcome of the process, and the nature of the material, equipment, etc. that the associated AI agent may transmit signals and commands to influence the performing of the process.

TABLE 1

Part 1

| Phase no | Phase Title | Goals | Means and tools | Sensors |
|---|---|---|---|---|
| 0 | Task Definition | | | Ambient air thermocouple<br>Hygrometer<br>Barometer |
| 1 | Smelter plant treatment | Reduction of alkalis<br>Reduction of bath and scum | TAC/Treatment of Aluminum in Crucible ®<br>ACS/Aluminum Crucible Skimmer<br>RAM (Hydro) | Metal level<br>Cameras<br>Balance (weight)<br>Metal Chemistry Detection Probe (Alkali, Fe, Cu) - Used LIBS?<br>Crucible weight<br>Rotational torque via motor drive<br>Temperature probe<br>Autonomous crucible transporter |
| 2 | Holding Furnace | Minimize dilution afterwards<br>Keep temperature below 750° C. (hydrogen solubility, minimize oxide formation, minimize foam generation, minimize spinel generation) | Furnace<br>Heating source<br>Incoming flow? | Smart thermocouple for metal temperature measurement<br>Metal Chemistry Detection Probe (Alkali, Fe, Cu) - Using e.g., LIBS<br>Rotational torque via motor drive |
| 3 | Metal treatment in the furnace | Lower the alkaline level<br>Remove dissolved hydrogen (secondary objective)<br>Reduce inclusions (secondary objective) | Furnace<br>Burners<br>Inputs: a) salt + stirring, or b) bubbling with gas<br>Favorite: Using a rotary injection system<br>Alternative: magnetic stirring and surface injection<br>Skimming (rakes or other means) | Alkali detection probe<br>Thermocouple<br>AlSCAN or HYCAL to measure the quantity of H2 at the inlet AND at the outlet |
| 4 | Casting trough or launder | Purification of aluminum<br>Preparing the Furnace<br>Control of initial pouring flow rates<br>Steady state flow control | Automatic skimming system<br>Barrier system<br>Culvert potting system<br>Slope towards the Furnace for easy cleaning | Thermocouple in metal<br>Laser or capacitance probe for measuring the level of liquid aluminum |

TABLE 1-continued

| Part 1 | | | | |
|---|---|---|---|---|
| Phase no | Phase Title | Goals | Means and tools | Sensors |
| 5 | Grain Refiner | Reducing the grain size in aluminum to increase its mechanical strength and facilitate its solidification | System for controlling the quantity of filler metal used for grain refining | Thermal analysis Liquid aluminum temperature |
| 6 | Degassing | Reducing hydrogen content in liquid aluminum Reduction of NA and Ca | Rotors Gas injectors AluClean FDD Ultrasounds | Temperature sensor (box) AlSCAN or HYCAL to measure the quantity of H2 at the inlet AND at the outlet LIBS probe (alkali measurement) Oxygen detector |
| 7 | Filtration | Removal of non-metallic inclusions | Option: Ceramic Foam Filter (CFF) Option: Deep Bed Filtration (DBF) PTF VPF Windsock Any possible combination of the different filters | Measuring inclusions Inline (input and output): LiMCA or BATSCAN (direct and instantaneous measurement) Offline: PoDFA Sensor (NON real-time analysis) Pressure loss Metal level before and after Temperature Porosity of filters to be used Use of covering gas |
| 8 | Solidification of liquid aluminum | Quality of the finished material | Mussels Seats Identification Inspection VDC HDC EMC WCC (Wire Continuous Casting) SCC (Sheet continuous Casting) SCC (Sow Continuous Casting) SICC (Small Ingot Continuous Casting) | Manufacturer Automation System STAS automated inspection by cameras and lighting Manual inspection Surface temperature of solidified aluminum Height of metal in the mold |
| 9 | Surface and internal inspection | Surface quality Geometric 3D Internal | Travel speed | STAS automated surface inspection by cameras and lighting or other surface sensor Manual inspection Automated ultrasonic inspection Automated X-ray inspection |
| 10 | Quality control | | Ultrasound Eddy current X-ray | |
| AI | | Connecting the control loops Determine the causes of defects Refining the algorithms Optimize processes Optimize according to criteria (e.g. quality, costs, component life cycle, number of operators, qualification, environment, product traceability, etc.) | Creation of digital twin Machine learning Historical | All sensors |

TABLE 1

Part 2

| Phase no | Sensors | Data analyzed/taken into account by the AI | Affected/Controlled Components |
|---|---|---|---|
| 0 | Ambient air thermocouple<br>Hygrometer<br>Barometer | Nature of the alloy to be produced<br>Final product details (e.g. shape)<br>Production expectations<br>Production cost expectations<br>Batch pilot and/or Furnace heel<br>Temperature, pressure, humidity | Alloy<br>Shape of finished product (ingot, billet, wire, etc.)<br>Amount of metal in the furnace including alloys<br>The whole metal treatment<br>Pouring time and flow rate |
| 1 | Metal level<br>Cameras<br>Balance (weight)<br>Metal Chemistry Detection Probe (Alkali, Fe, Cu) - Using e.g., LIBS<br>Crucible weight<br>Rotational torque via motor drive<br>Temperature probe<br>Autonomous crucible transporter | ALF3 injected quantity<br>Alkaline concentrations<br>Metal Chemistry Data<br>Rotor Condition (TAC)<br>State of the shovels (ACS)<br>Temperature<br>Amount of dross and bath removed<br>Emissions to the atmosphere<br>Location of scum in the crucible | Rotation speed of the rotor(s)<br>Amount of AlF3 injected into the crucible<br>Brewing time<br>Skimming number<br>Optimizing the trajectory of the skimming tool |
| 2 | Smart thermocouple for metal temperature measurement<br>Metal Chemistry Detection Probe (Alkali, Fe, Cu) - Using LIBS<br>Rotational torque via motor drive | Temperature<br>Alkaline concentrations<br>Time<br>Metal Chemistry Data<br>Emissions to the atmosphere<br>Weight | Burners<br>Quantity of raw material<br>Alloying elements |
| 3 | Alkali detection probe using e.g., LIBS<br>Thermocouple<br>AlSCAN or HYCAL to measure the quantity of H2 at the inlet AND at the outlet | Salt type (flux)<br>Salt quantity (flow)<br>Amount of gas (N2, Ar Cl2)<br>Number of rotary injectors<br>Agitator<br>Rotation speed of rotary injectors<br>Nature of rotary injectors<br>Magnetic stirrer<br>Concentration of alkalis<br>Temperature<br>Time<br>Emissions to the atmosphere<br>Torque | Brewing components<br>Input control<br>Heating source |
| 4 | Thermocouple in metal<br>Laser or capacitance probe for measuring the level of liquid aluminum | Surface appearance of the metal?<br>Amount of dross<br>Decanting (Settling) time<br>Aluminum level in the Furnace<br>Amount of aluminum in the Furnace | Furnace automation<br>Furnace burners<br>Furnace tilting system<br>Flow control system (pin) |
| 5 | Thermal analysis<br>Liquid aluminum temperature | Metal flow<br>Grain Refining alloy | Refiner flow rate |
| 6 | Temperature sensor (box)<br>AlSCAN or HYCAL to measure the quantity of H2 at the inlet AND at the outlet<br>LIBS probe (alkali measurement)<br>Oxygen detector | Temperature<br>Amount of H2<br>Concentration of alkalis<br>Rotor rotation speed<br>Gas flow (argon, nitrogen, chlorine, etc.)<br>Time<br>Emissions to the atmosphere | Heating elements (box)<br>Rotor rotation speed<br>Gas flow (argon, nitrogen, chlorine, etc.)<br>Salt flow rate<br>Metal level |
| 7 | Measuring inclusions Inline (input and output):<br>LiMCA or BATSCAN (direct and instantaneous measurement)<br>Offline:<br>PoDFA Sensor (NON real-time analysis)<br>Pressure loss<br>Metal level before and after<br>Temperature<br>Porosity of filters to be used<br>Use covering gas | Liquid Aluminum Data (Non-real-time) data on inclusions<br>Amount of metal passed through the filter | Priming<br>Heating system<br>Changing the filter elements during treatment<br>Metal flow control |
| 8 | Manufacturer Automation System<br>STAS automated inspection by cameras and lighting<br>Manual inspection<br>Surface temperature of | Metal temperature<br>Descent speed<br>Water flow to the mussels Molds<br>Water temperature<br>Lubrication status<br>Condition of molds and seat | Mold decent speed<br>Metal flow<br>Metal temperature<br>Ultrasonic refining<br>Casting speed<br>Lubrication rate |

TABLE 1-continued

Part 2

| Phase no | Sensors | Data analyzed/taken into account by the AI | Affected/Controlled Components |
|---|---|---|---|
| | solidified aluminum Height of metal in the mold | Time | |
| 9 | STAS automated surface inspection by cameras and lighting Manual inspection Automated ultrasonic inspection Automated X-ray inspection | Accepted or rejected default settings Rejection/acceptance quantities | All metal processing equipment Demolding components Grippers or clamps |
| 10 | | Rejection/acceptance quantities Customer Claims and Complaints | |
| AI | All sensors | All systems and their data Rejection/acceptance quantities Customer Claims and Complaints Amount of greenhouse gas emissions and harmful to the environment | All metal processing equipment as well as adjustment of various processing parameters in real time or offline between batch processing and alloy changes |

It is worth noting that according to embodiments and plans in which the ACHRIOS may be implemented, the number and nature of the equipment and sensors present may vary. For instance, some sensors listed in Table 1 may be used for collecting data during a machine-learning phase, and may be absent from production embodiments of ACHRIOS without preventing the ACHRIOS to be operational. Based on empirical data, the AI engines may evaluate indirectly the data provided by the absent sensors, or mitigate its absence with other controls, either in the associated process, or within the preceding process or the subsequent process. The list and nature of sensors are for illustration purpose, and are drawn to providing a most-complete set of empirical data for the machine-learning phase of the AI engines. The list and nature may vary for the production, and or in the future as new techniques for collecting data, collecting data faster, or collecting more precise data may emerge.

Referring to Phase 0 of Table 1, the goal of this phase is to collect data, including environmental data and determine how these data influence e.g., degassing. The more an operating condition is humid and warm, the higher the hydrogen level will be before degassing and subsequently, the recovery will be faster if the scupper line is long. It is worth noting that the type of alloy to make has an influence on the metal treatment. Alloys with a high magnesium content (AA-5XXX) are more difficult to degas. Avionics alloys (AA-7XXX) are very sensitive to inclusion and oxide content.

Referring to phase 1 of Table 1, depending on embodiments, the metal level in crucible is normally between 0.8 to 1.5 m. Metal temperature is between 750° C. and 850° C. Metal weight is between 5 to 15 tons. Amount of dross produced is between 2% to 4%. Rotation torque is monitored to determine if the rotor is wearing. Example of results of metal chemistry by LIBS (% or ppm) is shown on FIG. 34. Condition in this phase is to reduce alkalis in the metal from electrolysis, aluminum fluoride (AlF3) and the target value is normally 0.5 kg AlF3 per ton of aluminum. Typical values before treatment vary between 300 and 100 ppm sodium, 0 and 30 ppm calcium and 0-10 ppm of lithium. After treatment, Sodium is lower than 20 ppm, Calcium is lower than 10 ppm and Lithium is lower than 5 ppm. Once the treatment is done, there is another skimming whose quantity varies between 2% to 4% of the weight of the metal. Normally, the treatment causes a loss of between 50° C. and 70° C. at the initial metal temperature.

Referring to phase 2 of Table 1, this phase concerns the holding furnace. In an exemplary use, 80 to 90% of the metal volume is transferred from the upstream remelting furnace. An amount of up to 20% recast is then added. However, depending on the type of burner, it will be possible to remelt up to 100% of waste with a predetermined chemistry.

In the case of electrolysis sites, the crucibles are skimmed and sometimes treated with a salt (TAC, RAM) before skimming in order to reduce the alkalis in the aluminum melt. This step serves as a temperature and metal chemistry control point not only for alkalis but for Iron (Fe), Copper (Cu), Silicium (Si) through the use of a LIBS (Laser Induced Plasma Spectroscopy). This data allows the metal to be segregated to minimize subsequent dilution.

Figure 16:
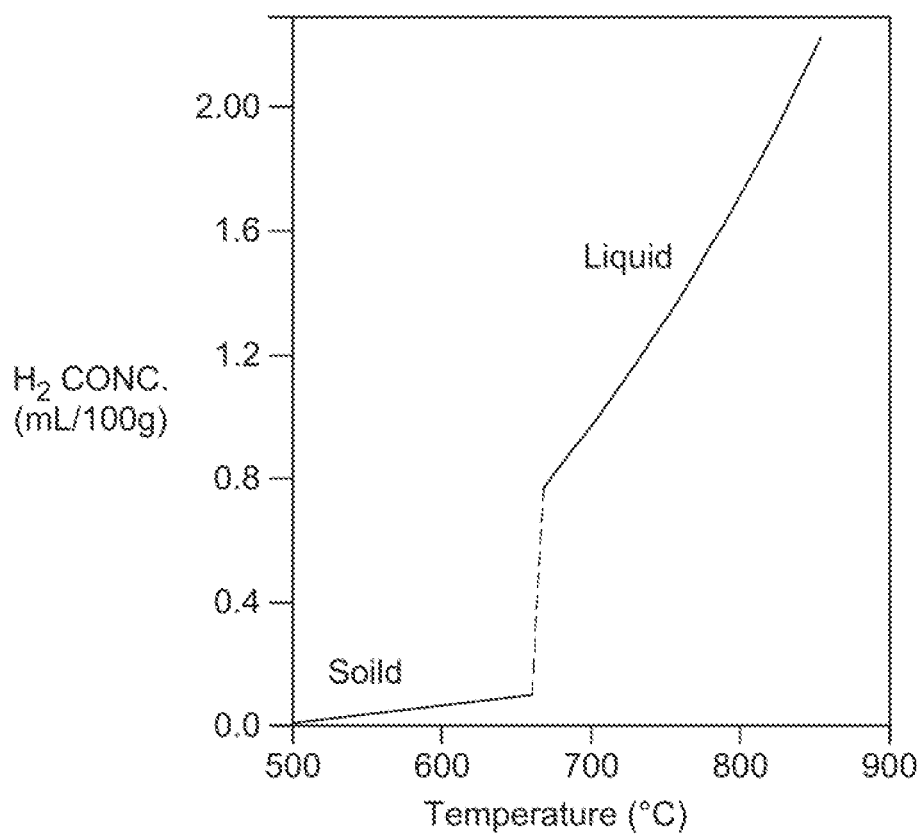
FIG. 16 is a graph showing hydrogen concentration versus temperature of liquid aluminum.
Figure 17:
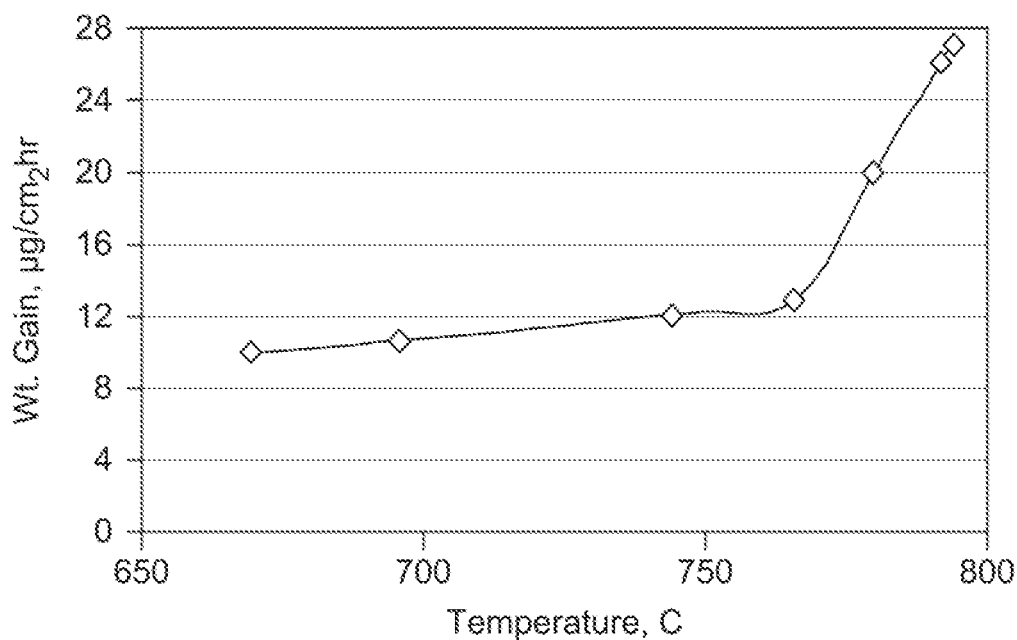
FIG. 17 is a graph showing relationship between temperature, oxide formation and foam generation.

Control of the furnace bath temperature is done via an intelligent thermocouple. The latter, on a ramp, is inserted into the furnace when the remelting, metal treatment and removed when skimming operations are carried out. The goal is to maintain the average temperature of the bath below 750° C. and preferably below 725° C. Maintaining the bath at a temperature above 750° C. has important implications for the rest of the process. Indeed, the solubility of hydrogen in liquid aluminum increases with temperature as shown in FIG. 16 showing hydrogen concentration versus temperature of liquid aluminum. It is worth noting that temperature over 750° C. also promotes oxide formation and dross generation as shown in FIG. 17.

Finally, oxides attached to the air/bath refractory interface when exposed to the high temperature atmosphere tend to form spinels which are a non-negligible source of inclusions according to the following reaction:

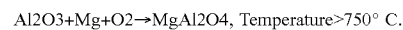

$$Al_2O_3 + Mg + O_2 \rightarrow MgAl_2O_4, \text{Temperature} > 750° \text{C.}$$

Figure 18:
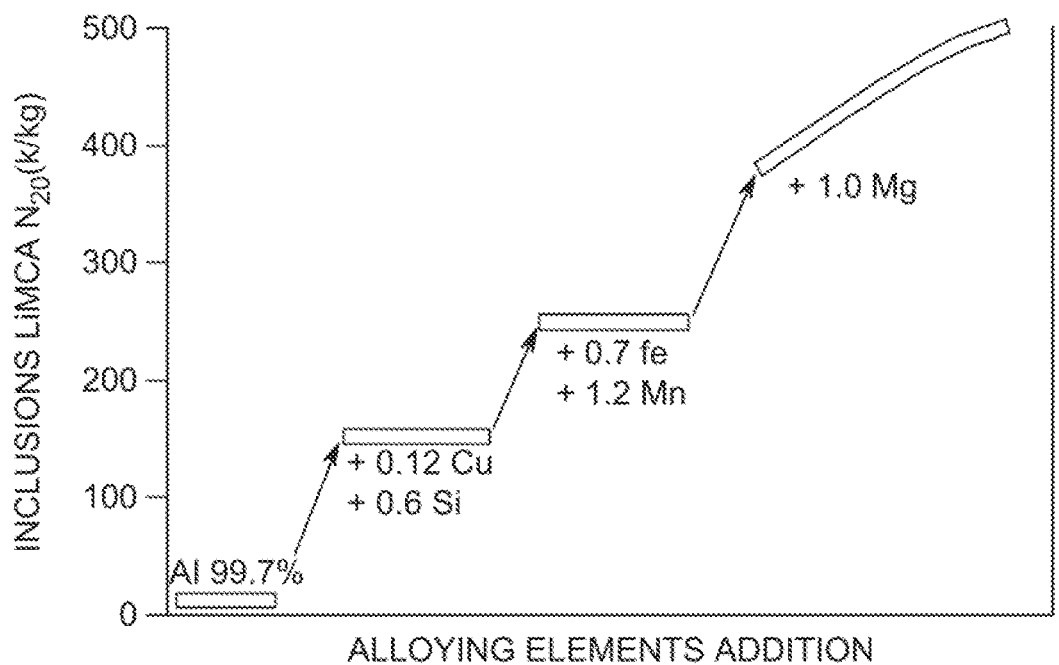
FIG. 18 is a graph showing relationship between elements additions and inclusions in aluminum.

The operation tends to prefer high temperature especially during alloying because it promotes the dissolution of certain alloying elements. However, in terms of metal cleanliness, alloying is a significant and non-negligible source of inclusions as shown in FIG. 18. The use of LIBS allows to check in real time the composition of the alloy and save the time of the current sampling. In this specific case, a sample of metal is taken, solidified in a mold to make a disk. This disk is then sent to the laboratory to be analyzed by spectroscopy. The result is then communicated to the operation which makes corrections if necessary. The LIBS measurement easily saves more than half-an hour which is ultimately turned into more castings per year.

The thermocouple and LIBS data is managed by an automaton directly connected to the burner control. This feedback loop allows to maintain the target temperature of the bath and to measure the chemistry of the prepared alloy. The data are measurements of temperature as a function of time and analyses of the elements present in the alloy of the furnace.

Referring to phase 3 of Table 1, this phase presents the treatment of metal mainly consists of lowering the alkali levels. This treatment is done according to an embodiment by throwing bags of salt on the surface followed by mechanical stirring. According to another embodiment, by injecting bubbles of a gas (Nitrogen or Argon) or a mixture of gases (Nitrogen-chlorine or Argon-chlorine) in order to reduce the alkalis such as sodium, calcium and lithium. According to another embodiment, by using porous plugs located at the bottom of the furnace and releasing the gas or the gas mixture described above. Finally, the use of a rotary injection system such as RGFI™ from STAS or the HD-200™ from Pyrotek are most effective methods of performing this treatment.

Figure 19:
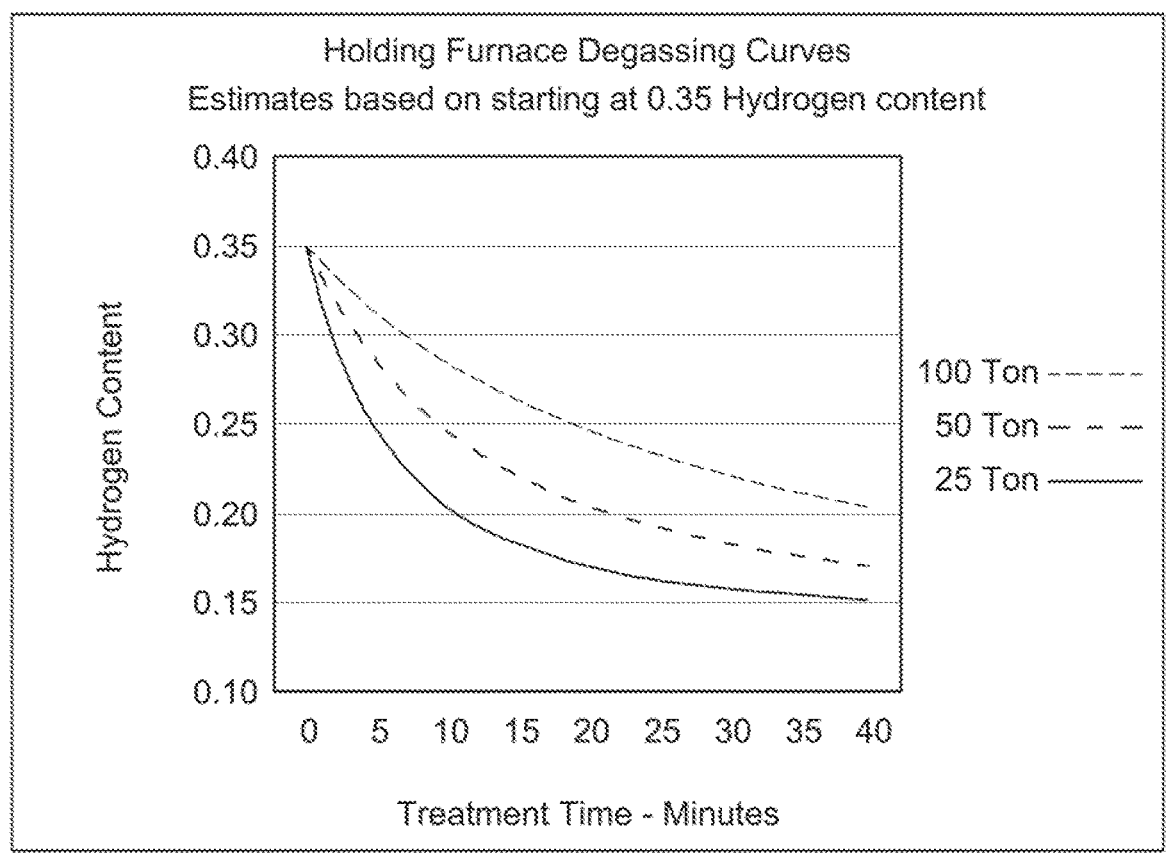
FIG. 19 is a graph showing exemplary hydrogen reduction during RGI furnace treatment.

The RGI or RFI depending on whether chlorine gas or a solid flux is used aims to reduce the volume of alkalis present in the aluminum bath. At the same time, a certain amount of dissolved hydrogen is removed (see FIG. 19 showing hydrogen reduction during RGI furnace treatment) as well as a certain number of inclusions.

The chemical reactions involved are primary reactions and secondary reactions as follows:

Primary Reactions

Al AlCl$_3$

Mg MgCl$_2$

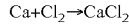

Ca+Cl$_2$→CaCl$_2$

Na NaCl

Li LiCl$_2$

Secondary Reactions

Ca CaCl$_2$

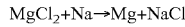

MgCl$_2$+Na→Mg+NaCl

Li LiCl$_2$

When chlorine gas (RGI) is used, all the reactions occur. When a molten flux is used (RFI), only the secondary reactions occur. The compounds formed in the form of liquid chlorine salts float on the surface of the bath. A probe located on the same ramp as the intelligent thermocouple is used to measure in real time the residual quantities of alkalis, whether sodium (Na), Calcium (Ca), Lithium (Li) or any other compound harmful to the cleanliness of the metal, using LIBS technology. These measurements allows controlling in real time the rate and duration of gas or flux injection. As mentioned, the microbubbles of gas or salt allows some removal of hydrogen and non-metallic inclusions.

Figure 20:
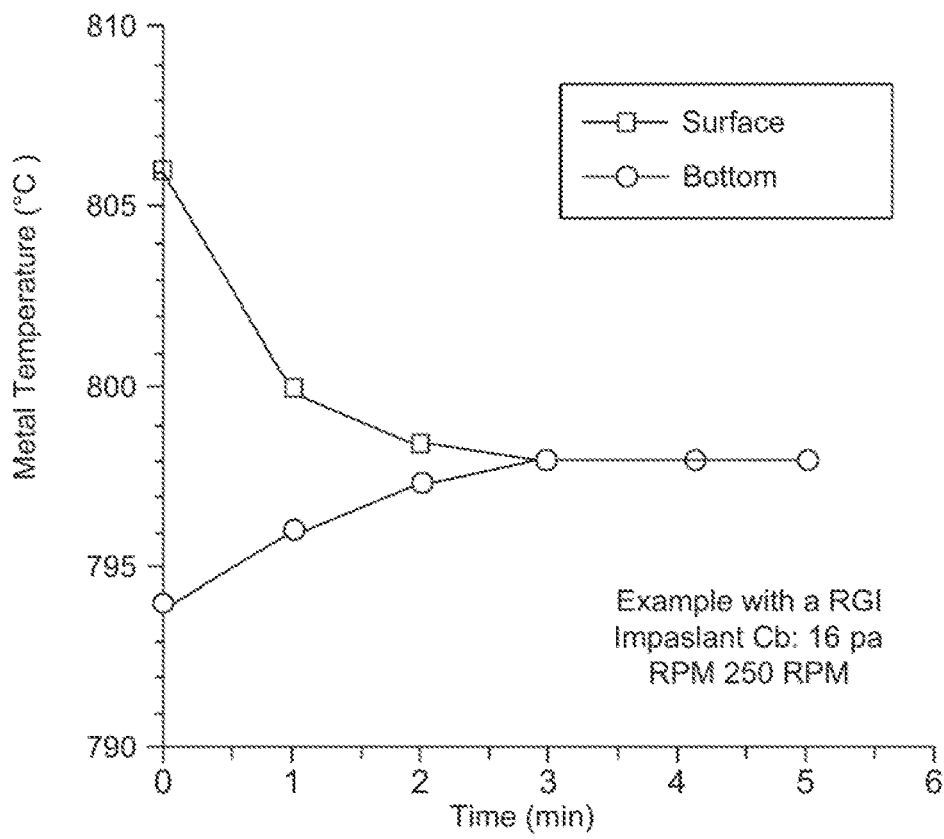
FIG. 20 is a graph showing exemplary bath temperature during the RGFI injection process.

The data collected by the LIBS and managed by the RGFI™ automation is concentrations in ppm of the critical elements measured. Stirring during injection has a positive effect on the bath temperature by homogenizing it as shown in FIG. 20 showing bath temperature during the RGFI injection process.

In an embodiment, metal level in furnace is between 0.9 to 1.5 m, with treatment of metal taking between 20 to 60 minutes with an amount of molten salt injected of about 0.5 kg per ton of aluminum. Typical values of alkali content for any source of metal, e.g., electrolysis or scrap recycling, vary. Examples of values are Sodium content being less than 50 ppm, Calcium content being less than 60 pp, Lithium content being less than 10 ppm.

After treatment with RGI (Argon+10% chlorine gas) or RFI (Argon+molten salt content 60% MgCl2-40% KCl), typical alkali values are less than 10 ppm for the Sodium content, less than 20 ppm for the Calcium content and less than 3 ppm for the Lithium content.

Metal temperature is maintained between 690° C. to 750° C. The RGI or RFI homogenizes the temperature during treatment. For example, as the metal is heated by burners above the metal, the temperature of the atmosphere above the metal is around 1200° C.-1300° C. and the temperature of the metal is hotter on the surface than at the bottom. There can be up to 50-70° C. difference. The effect of stirring during treatment reduces this temperature difference. For example, surface temperature is initially about 780° C. and at the bottom about 740° C. After treatment, metal temperature is around 760° C. from top to bottom.

Metal chemistry is monitored by LIBS in % or ppm, see example depicted via FIG. 34. Typically, furnace are containing between 35 and 200 tons of aluminum. Normally before treatment, there is the alloying which varies according to the specification of the latter. For example, Mn, Cu, Fe, Mg, Si etc. are added to the furnace. Once the alloys are added, a sample is taken, and the alloy chemistry is measured to ensure that the specifications are met. Then follows the treatment using the RGI/RFI according to the results described above. The furnace is then skimmed, and the amount of skimming can vary between 2 to 5% of the amount of metal in the furnace. The last step is the "settling" which is not done by all aluminum producers. It is a rest period varying from 10 to 30 minutes in order to sediment the non-metallic inclusions by gravity and thus pour a cleaner metal. Afterwards, the furnace is tilted feeding the trough or launder which carries the liquid aluminum to the other equipment in line. If the furnace is not tilting, there is a tap hole management by means of a partial obstruction of the hole using a manual or automatic mechanism. The tapping temperature is adjusted according to the length of the troughs or launders and the thermal losses measured up to the tap well for casting into billets or slabs (690-700° C.), or to the continuous caster of sheet or wire.

Figure 21:
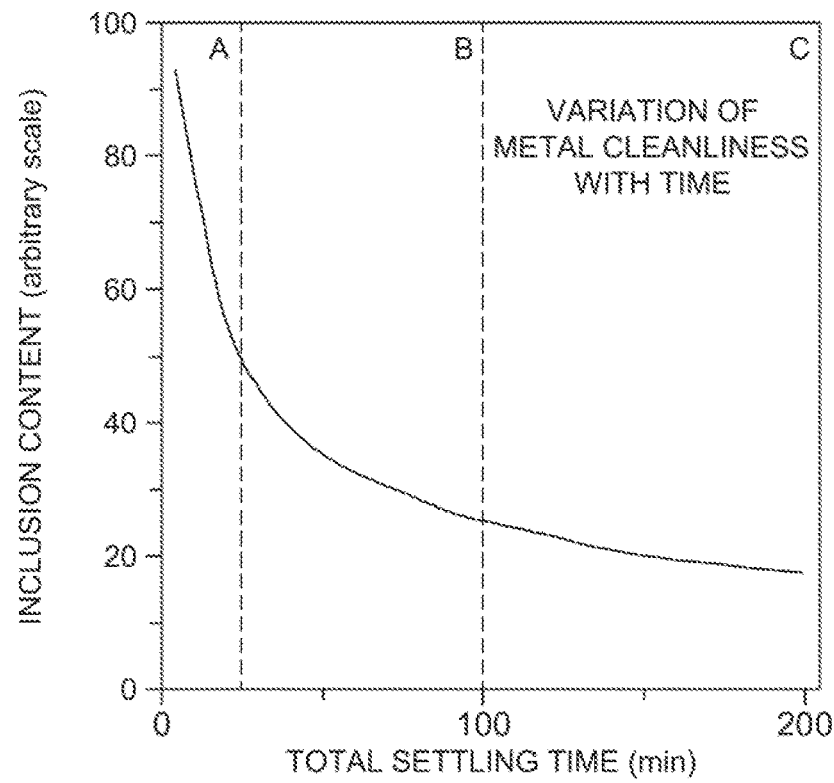
FIG. 21 is a graph showing relationship between settling time and inclusions.

Referring to phase 4 of Table 1, this phase presents processes after phase 3. After skimming and decanting, the liquid aluminum is ready for transfer to the casting table. Skimming is important in order not to transfer all the slag floating on the surface as shown in FIG. 7. It is also possible to skim the furnace with automatic systems such as those developed by MECFOR or Dynamic Concept for example. A settling period is performed and is beneficial for the removal of inclusions simply by gravity. FIG. 21 illustrates the effect of settling time on inclusions.

Figure 22:
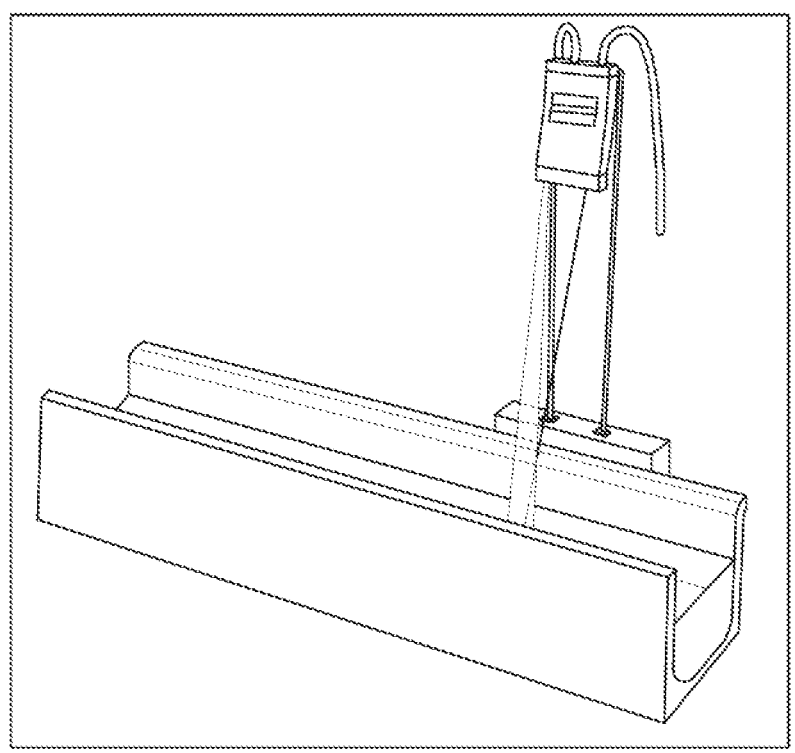
FIG. 22 is a representation of a level sensor in operation in accordance with an embodiment.

Casting troughs or launders are open shapes made of refractory material resistant to corrosion by aluminum. The insulation behind them must be sufficient to minimize heat loss and especially the loss of metal temperature. Depending on the geometry of the section and the insulation, the metal typically loses 1° C./m. It is normally recommended to use heated troughs or launders to promote operational stability. These allow the temperature of the metal coming from the furnace to be maintained and the overheating of the bath to compensate for the losses incurred during the transfer of the metal to the in-line processing equipment. The temperature and the level of liquid aluminum are essential to ensure operational stability. The level is measured using a laser or capacitance probe connected to the furnace controller which, depending on this level, controls the flow of metal and therefore the inclination of the furnace. FIG. 22 illustrates a level sensor in operation. Collected data are temperature and level measurements in that situation.

Dissolved hydrogen measurement are normally between 0.1 and 0.40 ml/100 g of aluminum, and most typically between 0.3 to 0.4 ml/100 g at the exit of the furnace. The process aims to keep or decrease the dissolved hydrogen value to less than 0.30 ml/100 g. Level variations must be limited during casting because these fluctuations cause an increase in oxides and inclusions. There are always automatic barriers before the degasser and the filtration unit. Other barriers allow the metal to be drained at the end of casting or during an emergency stop. The maximum speed normally accepted is 20 cm/second. If faster, there is turbulence in the elbows and the "Y", which reduces the cleanliness of the metal. Normally there is a slope towards the furnace from the degasser which is the highest point of the pouring line and a slope towards the furnace. This slope can vary but is normally 3 to 5 mm/m of troughs or launders in order to respect a minimum height of metal in the latter.

Figure 28:
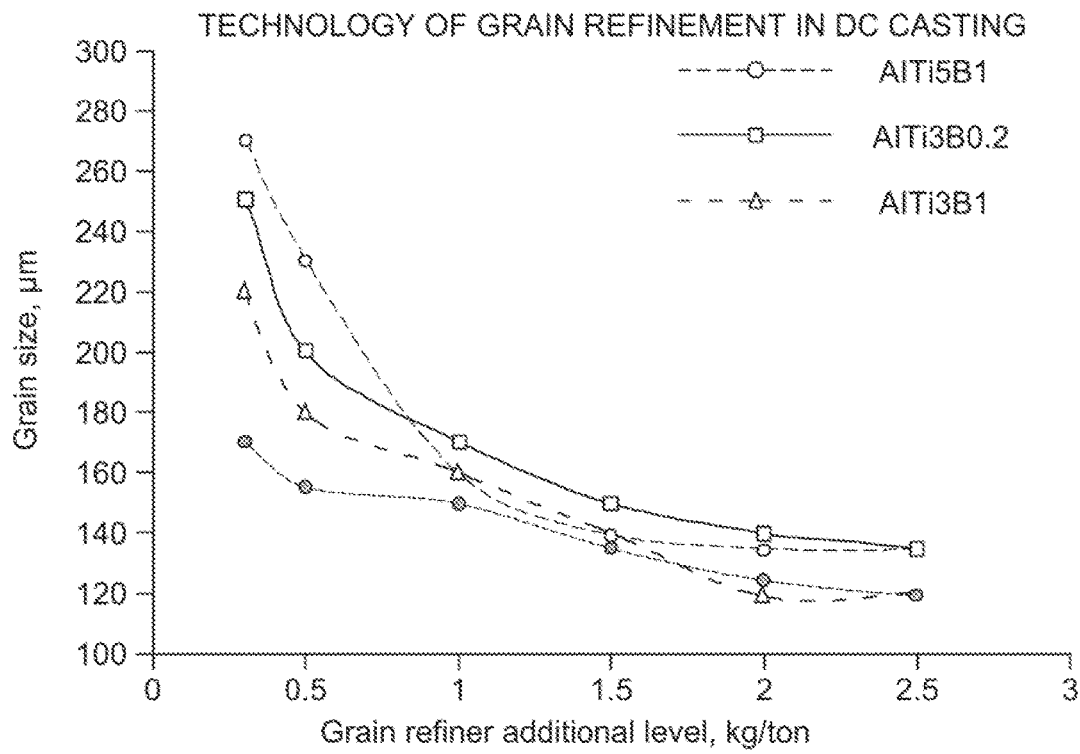
FIG. 28 is a graph showing the impact of different technologies of grain refinement in DC casting of aluminum.

Referring to phase 5 of Table 1, the purpose of the grain refiner is to obtain an optimal grain size during solidification and to respect the optimal mechanical properties of the cast alloy. The most used method is the injection into the troughs or launders of a rod of a titanium and boron based alloy. There are several types of rods, and they are used depending on the type of alloy being cast. Normally, they are formulated to obtain a rapid dissolution and typically, it must be added in order to have around 2 minutes of dissolution time. FIG. 28 shows the impact of different technologies of grain refinement in DC casting of aluminum.

Figure 23:
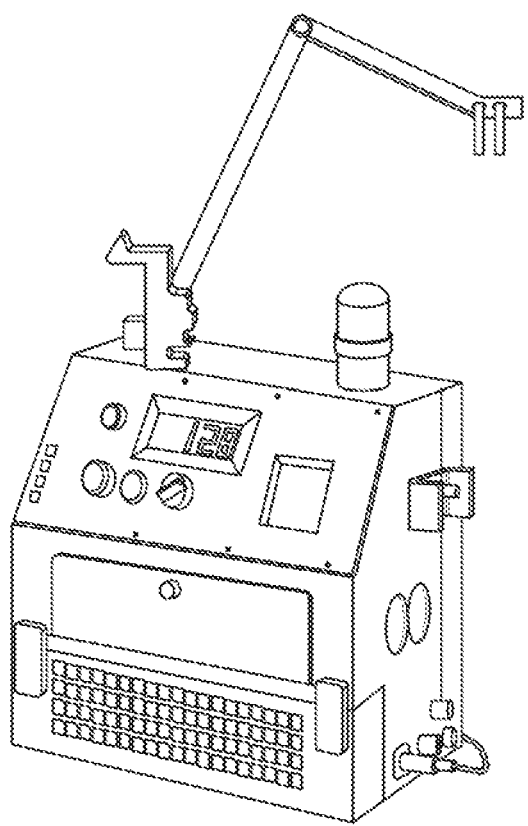
FIG. 23 is a representation of an AlSCAN in accordance with an embodiment.
Figure 24:
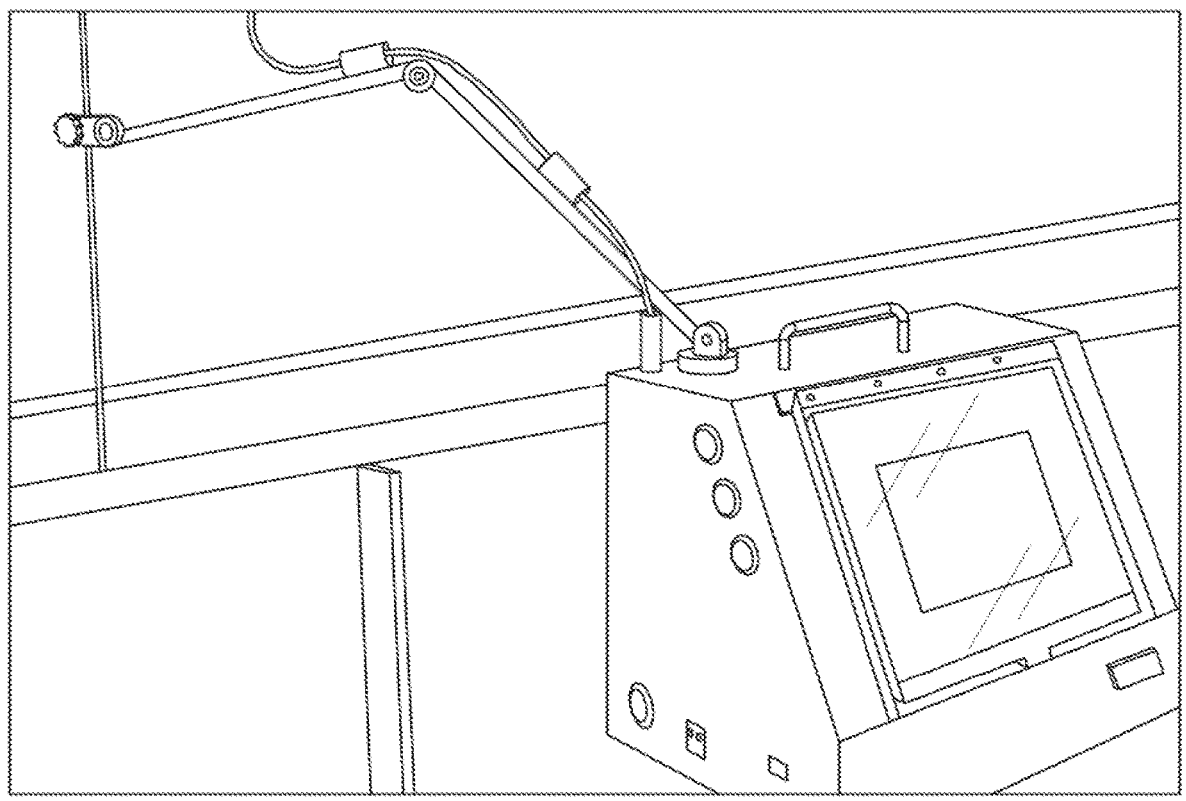
FIG. 24 is a representation of a HYCAL in accordance with an embodiment.

Referring to phase 6 of Table 1, this phase of degassing is necessary to reduce the hydrogen content normally below 0.15 cc/100 ml Al. With some alloys the limits are as low as 0.10 cc/100 ml Al. There are mainly 2 types of degassers: in-line and box. The rotation speed of the rotors and the quantity of gas have a direct effect on the quantity of hydrogen. These variables are controllable according to the quantity of hydrogen measured. This quantity is measured devices such AlSCAN or HYCAL. The AlSCAN (depicted in FIG. 23) measures hydrogen at equilibrium using a sensor immersed in the metal and converts this measurement into cc/ml of Al. HYCAL (depicted in FIG. 24) measures the equilibrium hydrogen concentration and converts it to cc/ml of Aluminum as in the case of AlSCAN.

Figure 25:
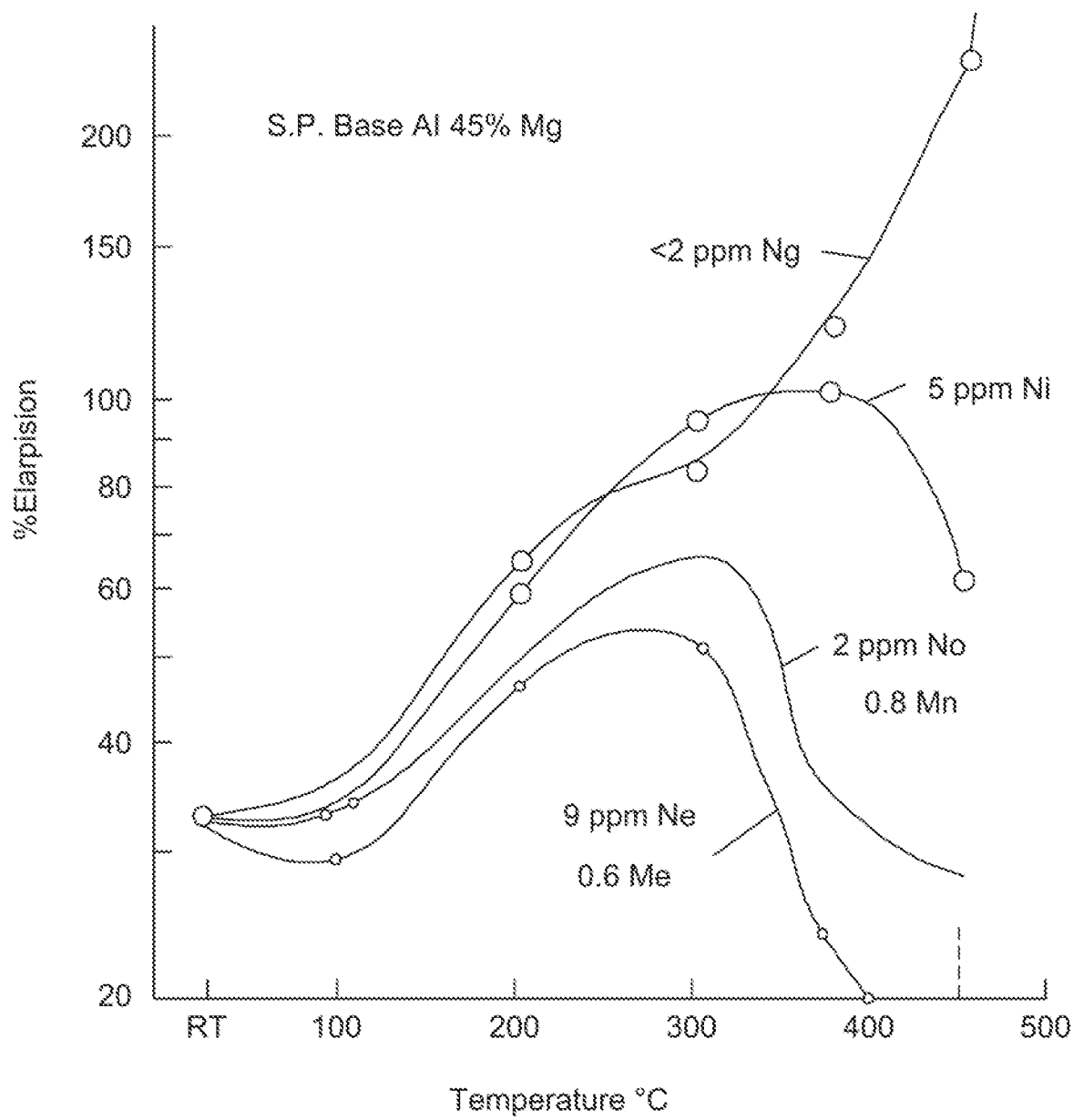
FIG. 25 is a graph showing relationship between sodium and cracking in accordance with an embodiment.

The ideal case is to place an analyzer near the degasser inlet and at the outlet to measure the hydrogen removal efficiency. With these measurements, it is possible to modify the rotation speed, or the amount of gas injected to optimize the degasser efficiency. Preferably, argon is the injected gas. However, nitrogen can be used knowing that it is not an inert gas with respect to liquid aluminum. In the case of some alloys, a small amount of chlorine gas is added to the main gas. Normally, this addition is around 1% of the total gas injected. The chlorine gas can be replaced by an injection of molten salt based on magnesium chlorine in order to reduce the remaining alkalis and float the non-metallic inclusions present according to the chemical reactions provided hereinbefore. With some alloys, the amount of sodium is very important and must be below 1 ppm. Otherwise, side cracking problems may occur during hot rolling of the ingots as illustrated in FIG. 25. A LIBS probe also placed at the outlet of the degasser allows continuous measurement of the alkali content as well as all alloying elements.

In an embodiment, dissolved Hydrogen measurement is between 0.1 to 35 ml/100 g of aluminum, and Typically less than 0.2 ml/100 g for billets, less than 0.15 ml/100 g for ingots, continuous wire casting or continuous thin sheet casting, and less than 0.12 ml/100 g with avionics ingots. Metal temperature is maintained between 700-740° C. Oxygen measurement is between 0.1 and 5%.

Degassing is necessary in order not to generate porosity in the solidified metal. In billet applications, nitrogen only is often used. However, nitrogen is not an inert gas unlike argon which is the gas of choice to use. The addition of chlorine or chlorine-based fused salts is necessary for alloys with magnesium or those for aeronautics. The amount of gas added as well as the rotation speed of the rotors depends on the type of alloy and the flow rate of the latter. For example, for an alloy containing a high percentage of magnesium (AA-5XXX) on a trough or launder degasser (ACD), rotation speed 800 rpm, injection of argon+1% chlorine at 60 l/minute on 8 rotors for a flow rate of 850 kg/minute For the same application with a box degasser, 2 chambers are used with a gas flow rate of 160 l/minute (Argon+1% chlorine) per rotor with a rotation speed of 450-600 rpm. An advantage of the scooper trough degasser is that there is no remaining metal, therefore ideal for alloy changes. In the case of a box type degasser, the liquid metal must be maintained between castings and drained if there is a change of alloy. Finally, if chlorine or chlorinated salt is present, degassing works on the alkali levels by reducing them significantly. For high magnesium alloys such as AA-5XXX, the sodium level must be less than 0.5 ppm.

Referring to phase 7 of Table 1, in this phase the degassed aluminum is routed to a filtration unit. This equipment allows the removal of non-metallic inclusions using mainly 2 types of filters. The first type is called CFF for Ceramic Foam Filter. It is a filter with a variable surface area depending on the flow rate to be filtered, made of porous ceramic allowing the aluminum to pass through while leaving the inclusions attached to the porosity system of the filter. Depending on the porosity of the filter used, an auxiliary priming system may be used to allow the liquid aluminum to completely wet the filter surface. There are different techniques used such as a partial vacuum, mechanical vibration or by electromagnetic force. Different arrangements are possible in order to be able to filter the desired aluminum flow rate such as a double ACF box. There are other porous media such as porous tubes or sintered particle filters.

A second widely used technique is Deep Bed Filtration (DBF). This is an insulated and heated refractory box containing a filtration media called tabular alumina. There are several layers of filtration media of different sizes ranging from 18-20 mm to 1-3 mm. The liquid aluminum passes through the bed leaving inclusions in the internal porosity of the bed as a swimming pool filter does. The dimensions of the bed are a function of the flow rate of aluminum to be filtered. The aluminum is kept liquid between the different flows using a heating system.

Figure 26:
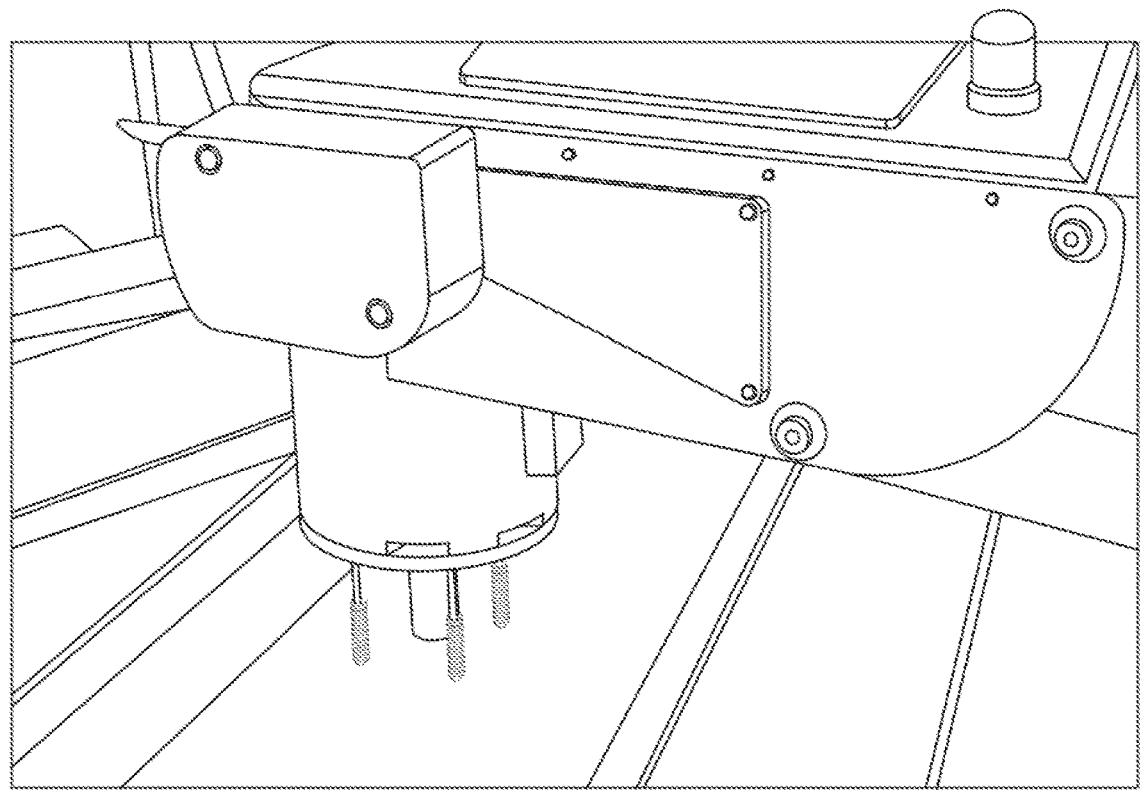
FIG. 26 is a representation of a LiMCA in accordance with an embodiment.
Figure 27:
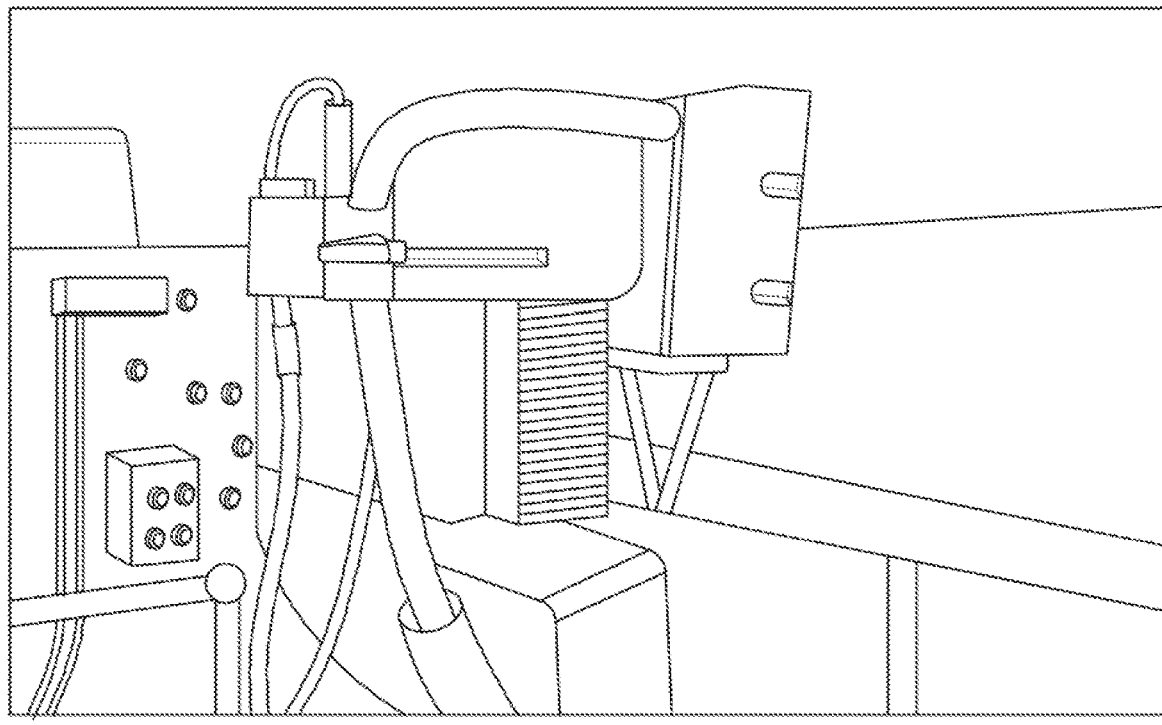
FIG. 27 is a representation of a BATSCAN in accordance with an embodiment.

These filtration technologies allow the removal of non-metallic inclusions in liquid aluminum. Nowadays, there are two widely accepted technologies in the industry for continuous measurement in liquid aluminum. There is the LiMCA and the BATSCAN. The LiMCA measures the quantity and size of inclusions present by changing the resistance of a current passing between 2 calibrated electrodes. FIG. 26 illustrates a LiMCA in operation. The BATSCAN (depicted on FIG. 27) measures inclusions by ultrasound. These two techniques provide a direct and instantaneous measurement of the cleanliness of the metal. Preferably, in the case of filtration, a measurement unit before and after the filtration equipment makes it possible to measure the filtration efficiency as well as to see the deterioration of the filter bed as a function of the tonnage in the case of DBF filtration technology. In the case of CFF, as the latter is single-use, deterioration of the filter does not arise. However, a third inclusion measurement technique is essential in order to have a complete picture of the cleanliness of the metal. This technology is called: PoDFA. It consists of taking a sample of liquid aluminum and passing it through a filter. The inclusions are concentrated on the filter and this filter is then cut and mounted in order to determine the quantity and nature of the different inclusions. The measurement is given in mm2/kg. Other similar techniques such as LAIS can also be used to determine the nature of inclusions. All of them allow the filtration to be qualified without having a direct effect on the process in operation.

In an exemplary embodiment, Inclusion measurement by LiMCA in K/kg is about N20<50K/kg of AI for billets—N20<10 for rolling ingots, by PoDFA, Prefil, LAIS: 0 to 0.2 mm2/kg of aluminum.

Metal temperature is maintained between 700 to 730° C. Filter porosity of CFF is about 20 to 80 ppi. If needed, gas coverage in liter/minute is about 20 to 25 SLPM.

Filtration is necessary in most cast products. In the case of rolling ingots, thin sheets by continuous casting and often on continuous casting of wires, For billets, filtration is used on certain alloys more demanding in terms of cleanliness than the typical AA-60XX alloys such as AA-5XXX and AA-7XXX. For billets when filtration is used, it is carried out with a CFF (Ceramic Foam Filter) typical of 30 or 40 ppi (pore per inch).

For rolling ingots, CFF and DBF are the two most used filtration modes. The size of the filters are determined according to the flow rate of metal to be filtered. An example is the use of two CFF boxes in parallel for a flow rate of 1000 kg/minute using 50 ppi CFFs of 23"×23". See the conditions of use of CFFs according to the different types of castings in the table below. The efficiency of a 50 ppi CFF filter is given in the figure below based on the LiMCA measurement.

Figure 29:
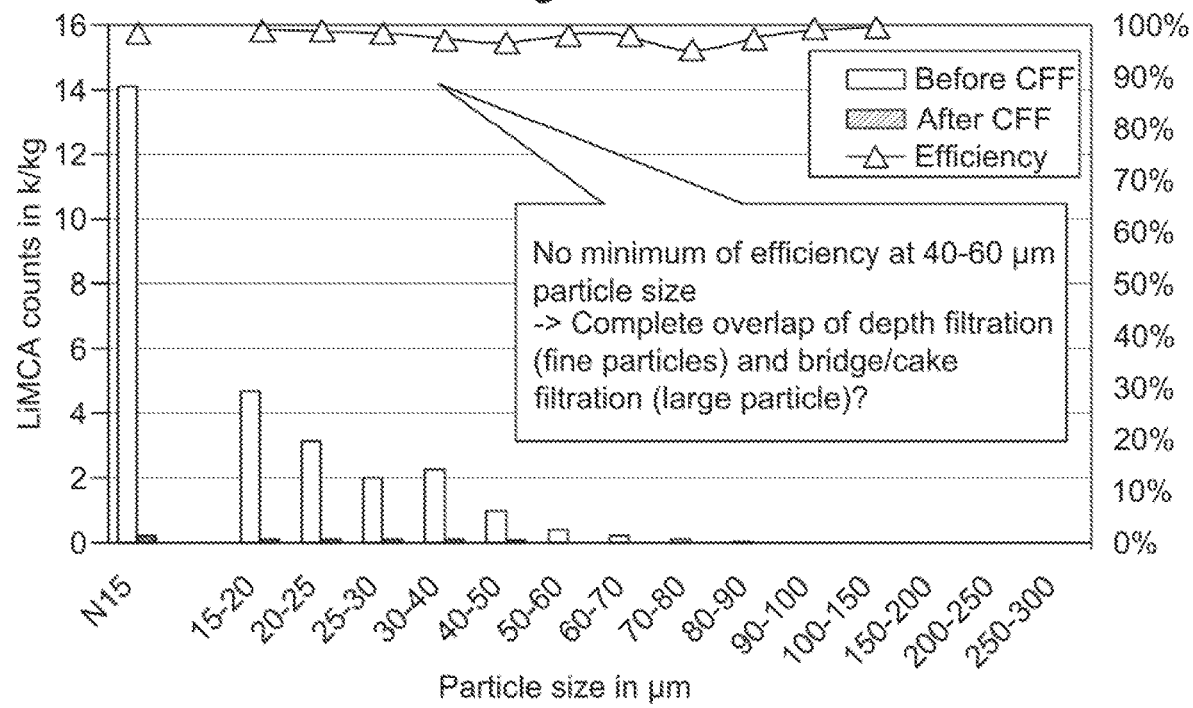
FIG. 29 is a graph showing filtering process in accordance with an embodiment.
Figure 30:
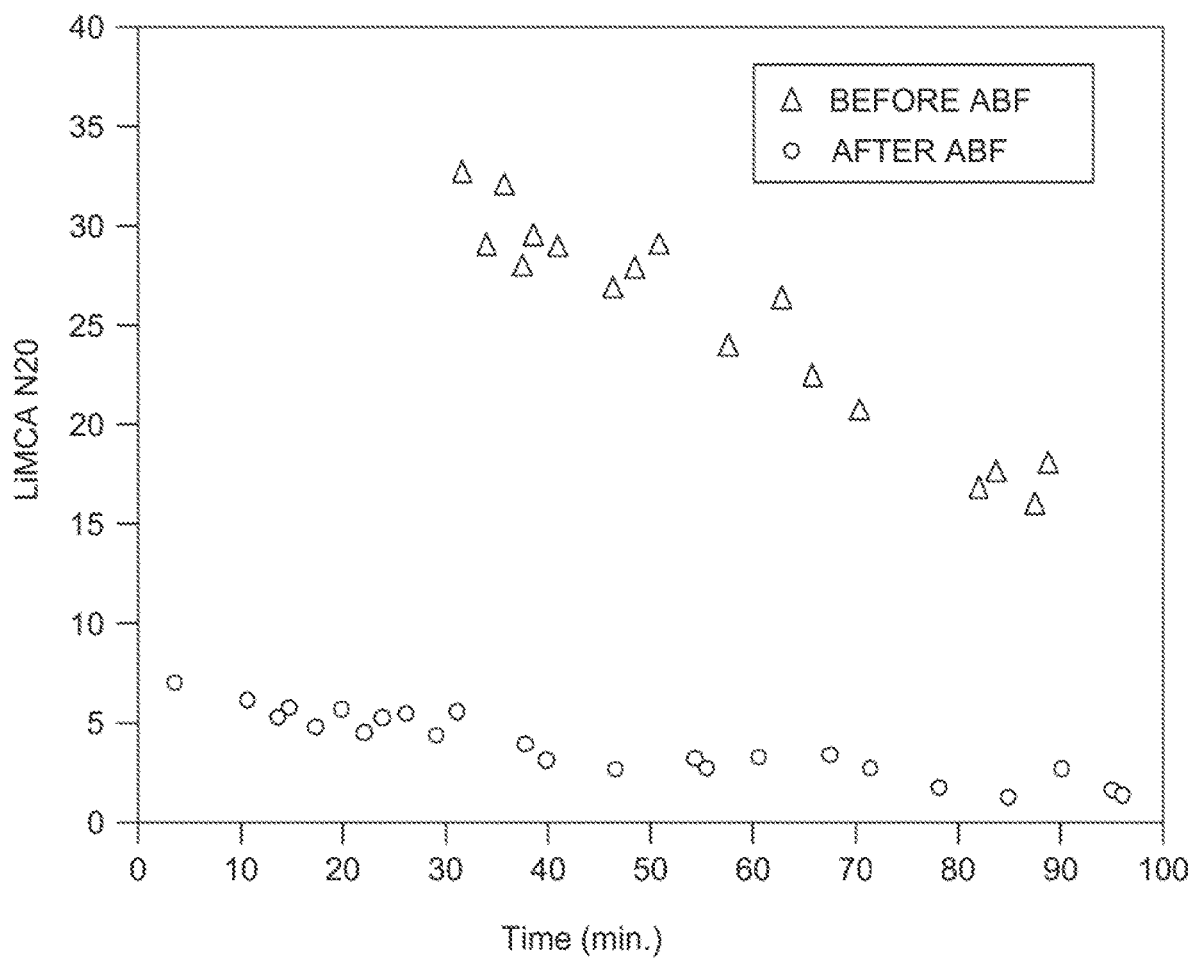
FIG. 30 is a graph showing effect of time over filtering process in accordance with an embodiment.

Metal flow speed typically varies between 3-10 mm/sec depending on the type of articles, with the flow in kg/sec/mm2 varying accordingly between 6 and 36, the filtering characteristics between 20 and 80 ppi. FIG. 29 depicts graphically typical filtering process. FIG. 30 depicts effect of time over filtering process.

Referring to phase 8 of Table 1, in this phase the liquid aluminum is set into semi-finished articles such as billets and rolling plates. There are other types of solidification such as continuous wire casting, continuous thin sheet casting, ingot mold and pig carousel. All these solidification techniques have different requirements in terms of purification. For example, pig iron casting is often done directly from the electrolysis crucible without any other prior step.

There are variants of the equipment that solidifies aluminum into billets. The diameter of the billets varies from 50 mm to 1000 mm. The distribution of the liquid aluminum to the different molds is very important in order to minimize the temperature loss and to ensure an equal and constant supply to all the molds. There are several variables to control in the process of solidifying (depending on technique), comprising metal temperature, descent speed, water flow to the molds, water quality and temperature, lubrication, condition of the molds, etc.

It is to be noted that each billet is subject to inspection to ensure that the cast products meet customer expectations, either manual or automated (such as the automated inspection system of STAS that uses high-definition cameras coupled with a lighting system to scan the surface and identify the various defects found.

There is a unique technology based on electromagnetic force called EMC for Electro Magnetic Casting. The metal distribution system is similar, but the liquid aluminum does not touch the mold and only relies on secondary cooling to perform solidification. There is no lubricant, and the shell layer is practically non-existent avoiding the removal of a thickness of metal varying between 5 to 15 mm depending on the mold technology used.

A lot of variation exists depending on the type and technology of casting. Based on the technology, the requirements in lubricant, in cooling water, in casting time will vary greatly. Furthermore, the characteristics of the aluminum to be cast will be more or less critical based on the technology.

Figure 31:
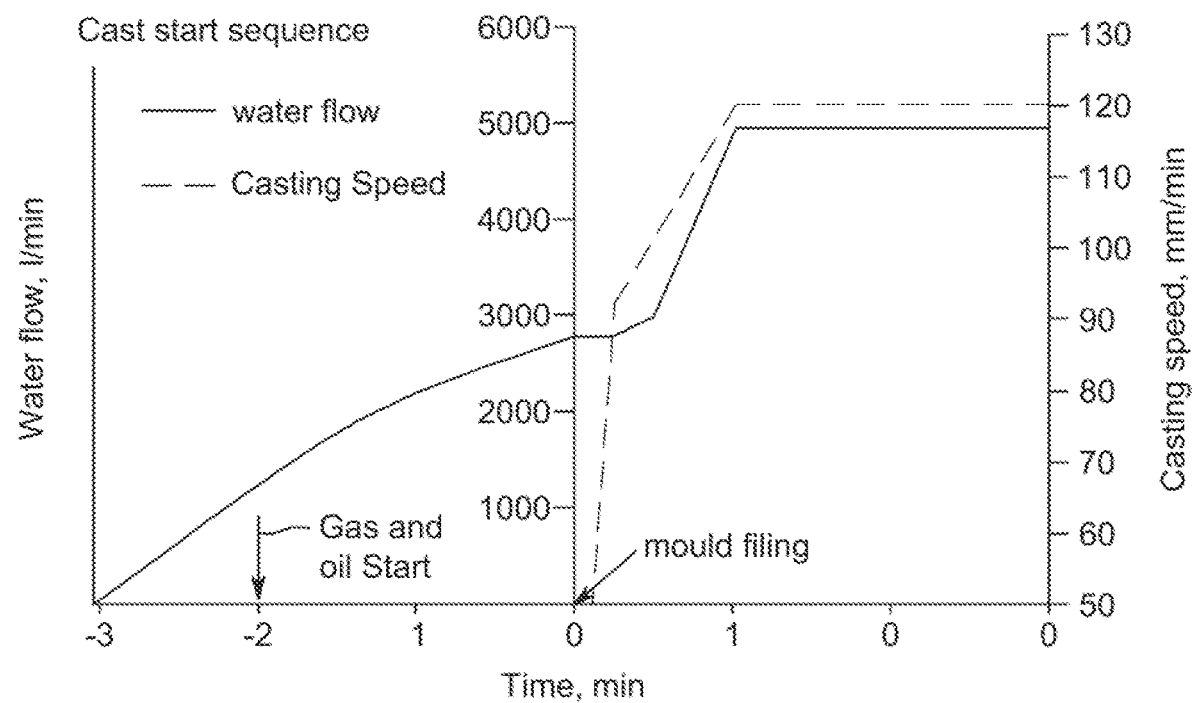
FIG. 31 is a graph showing the beginning of casting process in accordance with an embodiment.
Figure 32:
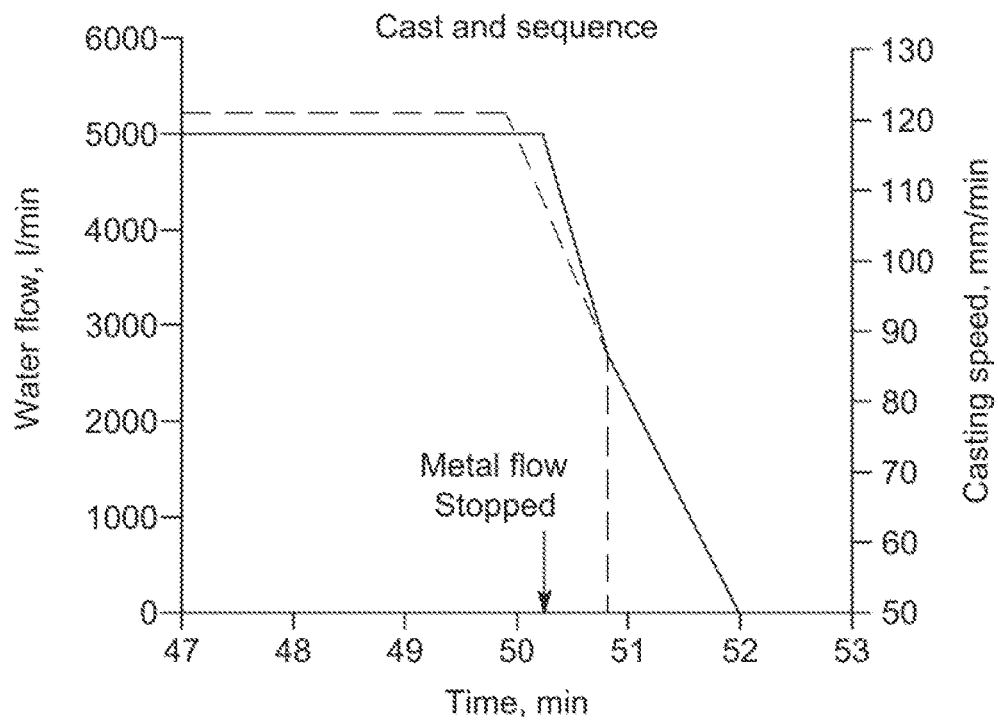
FIG. 32 is a graph showing the end of a casting process in accordance with an embodiment.

FIG. 31 and FIG. 32 show exemplary cast starting sequence and cast ending sequence. FIG. 33 illustrates a monitor with displayed data collected during a casting process.

As described before, the casting process is broken down into different independent phases (or processes) linked together by the liquid metal but typically with no overall control link. The present use of AI agents allows a smart casting line that links the phases. It optimizes the line operation, which means a different factor of all of the followings, comprising to cast the liquid aluminum with the lowest possible temperature to minimize natural gas consumption, to avoid overheating the metal, to keep oxidation to a minimum and minimize hydrogen dissolution. By doing so, the RGFI time is optimized. During casting, the degasser gas consumption is optimized, generating less oxide and controlling the acceptable inclusions, increasing the life of the filtration system, and minimizing the defects of the solidified aluminum articles.

AI agents are capable to make connections between the different processes that humans cannot do nowadays. The quality of the data measured are of upmost importance, data collected by sensors such as:

Thermocouples—Furnace, trough or launder, degasser, filtration, distributor trough or launder, solidification mold;
Metal level—Furnace, trough or launder degasser, distributor trough or launder or casting table;
LIBS—Furnace, degasser;
HYCAL—Degasser;
BATSCAN—Filtration;
BSI—Billet surface; and
Surface quality analyzing systems.

Several considerations can have an impact on the economic output of the system. These considerations could be used by one or many agents. For instance, each AI agent can impact the economics of the casting plant. The following considerations are non-exhaustive examples separated by sub-process.

Furnace
The selective choice of scrap categories along with the use of LIBS will certainly save time;
Optimization of treatment by RGI/RFI and information in subsequent processing;

Continuous LIBS analysis or equivalent saves time and avoids over-quality;

It is estimated that these two factors will save around 20-25 minutes per batch. At the end of the line, this time will allow for casting more aluminum with the same equipment;

Typically, the labor cost of a casting center is about $5000-6000 per hour.

An average of 6 casts per day, this represents approximately 5000 more tons per year; and At an average price of $2500 per ton, this could represent up to $12.5M.

Degasser

The use of LIBS and continuous hydrogen measurement allows for the use of the amount of gas (Ar, Ar/Cl2) necessary for treatment instead of using a recipe that works for all alloys;

Argon costs about $1 per $m^3$, and this could save several tens of thousands of dollars per year;

If 10% of Ar is saved per cast at 6 casts per day, savings would be more than $15,000 per year in gas alone; and Less gas equals less dross generated; and dross treatment costs around $350 per ton, which could represent a few thousand dollars per year.

Filtration

Continuous inclusion analysis will allow for extending the life of the DBF bed. For example, continuous inclusion analysis will provide metrics used to determine whether the DBF bed be changed instead of changing it at a fixed tonnage;

The continuous inclusion analysis will consider different alloys while ensuring impeccable metal cleanliness; and This could save several tens of thousands of dollars per year.

Casting

Whether for slabs or billets, the ability to identify defects through e.g., BSI or AIIS will allow for corrections either on the molds or the casting recipe; and If one or two ingots are saved per month, this could represent several thousands of dollars per year.

Labor

An intelligent casting line will reduce the number of operators needed for its operation;

Today, a slab casting center operates with 5 people, and this number could be reduced to 3; and An employee at a casting center (In NA or Europe) represents about $100,000 per year.

In summary, while depending on casting plants, the savings can be significant and distributed over the whole casting process and associated with some process or material.

Furthermore, the present ACHRIOS has environmental effects, or several considerations can have an impact on the environmental output of the system. The following considerations could be used, or achieved, by one or many agents in the AI system:

Less CO2

Less chlorine

Less heat loss (less energy used)

Less generated dross to be further treated

Less rejected ingots to be further remelted

Referring to FIG. 35 in view of FIG. 5, a program 3501 for collecting empirical data is ran, with a portion of the empirical data being stored as building data 3502 and another portion as raw validation data 3503. The building data is fed to a machine-learning process 3504 in which the building data 3502 is processed in order to generate a neural network, a weight matrix, a matrix-based processing algorithm or another type of artificial intelligence applicable for the generation of the general AI engine and the associated AI engines 3510 and 3511-1 to 3511-$n$, with the AI engines at this step being under construction AI engines 3510, 3511. Independently, a program 3505 processes the raw validation data 3503 to trim the empirical data of a portion of the information, thereby generating a new set of validation data 3506. Intelligence of the under constructions AI engines 3510, 3511 are tested using at least a portion of the validation data, with the validation process aiming to validate that the under construction AI engines 3510, 3511 can operate according to the desired hierarchical structure, can generate acceptable projections, can operate with limited data, and to determine which data is critical in controlling the processes. If the result of the validation process is not satisfactory, the machine learning model generation 3504 is enriched with the outcome of the validation process. When the validation of the under construction AI engines 3510, 3511 is satisfactory, deployable AI engines 3520, 3521 are compiled and ready for distribution in processing conditions in ACHRIOS plants.

Referring back to FIG. 5, it is worth reminding that, according to a distributed structure, once operable AI engines are distributed in casting plants, as processes are performed, the AI engines are designed to transmit new data to the server running the collecting data program. Thus, the AI engines of plants operating an ACHRIOS can be updated as new versions of AI engines are generated and compiled. So, as time passes, the AI engines will improve based on the additional empirical data collected in all ACHRIOS casing plants. Alternatively, a central structure may be used wherein the AI engines 3520, 3521 are operating by servers and connected to the casing plants on the Internet, without departing from the scope of the description.

A mix of edge computing in which the AI engines are distributed into ACHRIOS casting plants and server computing where AI engines are operating from servers in cloud is also available without departing from the scope of the present description.

FIGS. 36A and 36B are depicting a complete algorithm for training a machine learning model to predict the quality of aluminium extrusions based on various input parameters. Exemplary code of an AI system and result of partial optimization of aluminum processing for predicting the quality of aluminum extrusions with a Random Forest Regressor algorithm is listed in FIGS. 36A and 36B. This exemplary algorithm provides a structured approach to predicting quality scores in aluminum extrusion processes using machine learning techniques. The results indicate that the model performs well with a high $R^2$ score and low mean absolute error while highlighting the importance of different input features in determining product quality.

FIGS. 37A and 37B are depicting an alternative algorithm for predicting the quality of aluminum extrusions using Gradient Boosting Regression. This algorithm is known for its efficiency and accuracy in handling complex relationships in data. FIGS. 37A and 37B are depicting exemplary code of an AI system and result of partial optimization of the aluminum processing with the Gradient Boosting Regression algorithm, for example. This algorithm employs Gradient Boosting Regression to predict quality scores in aluminum extrusion processes effectively. The results demonstrate strong predictive performance with a high $R^2$ score and low mean absolute error while providing insights into feature importance that can guide process optimization efforts in real-world applications of aluminum manufacturing.

In the present description, the expression "physical processing" is intended to comprise a physical modification of the volume of aluminum, including mixing, modifying flow speed through e.g., modification of height, and removal of material such as dross.

The expression "additive" in intended to comprise addition of material to the volume, that material being either one or a combination of solid material such as salt, liquid material, and gaseous material.

The expression "energy" in intended to comprise any source of energy inputted in process the volume of material, either directly or indirectly, and in any form such as electric energy, heat, work, potential energy such as height or pressure, etc.

The expression "raw material" in intended to comprise material placed in the furnace.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A method of producing an article of aluminum through a series of subsequent phases in which is processed, using production equipment, a volume of aluminum, the method comprising:
    having an Artificial Intelligence (AI) system receiving at least one manufacturing parameter to be optimized for the article or its production;
    having the AI system processing the at least one to-be-optimized manufacturing parameter and generating at least one operating condition for a first phase among the series of subsequent phases;
    having the AI system processing the at least one operating condition, and generating at least one AI operating parameter for processing the volume of aluminum using production equipment associated with the first phase;
    having the production equipment associated with the first phase processing the volume of aluminum according to the at least one AI operating parameter;
    wherein there is a first operating parameter for obtaining a volume of aluminum having an optimized quality characteristic at the end of the first phase, and
    wherein having the production equipment associated with the first phase performing the at least one AI operating parameter generates a deviation compared with having the equipment associated with the first phase performing the first operating parameter.

2. The method of claim 1, wherein the volume of aluminum obtained when the production equipment associated with the first phase is performing according to the at least one AI operating parameter has not the optimized quality characteristic.

3. The method of claim 1, wherein processing the wherein the volume of aluminum involves performed physically processing the volume of aluminum, wherein the deviation comprises at least a deviation in an amount of physical processing of the volume of aluminum.

4. The method of claim 1, wherein processing the wherein the volume of aluminum involves adding an additive to the volume of aluminum, wherein the deviation comprises at least a deviation in an amount of the additive.

5. The method of claim 1, wherein processing the wherein the volume of aluminum involves heating the volume of aluminum, wherein the deviation comprises at least a deviation in energy used for heating the volume of aluminum or time when heating the volume of aluminum.

6. The method of claim 1, wherein processing the wherein the volume of aluminum involves providing a settling period to the volume of aluminum, wherein the deviation comprises at least a deviation in the settling period.

7. The method of claim 1, wherein processing the wherein the volume of aluminum involves selecting a mix of raw material of at least two sources to form the volume of aluminum, wherein the deviation comprises at least a deviation in a ratio in the mix of raw material of the at least two sources.

8. The method of claim 1, further comprising having a sensor monitoring the production equipment processing the volume of aluminum, generating monitoring data, and transmitting monitoring data to the AI system, wherein the AI system further generating at least one additional AI operating parameter for a further processing of the volume of aluminum using production equipment associated with a phase subsequent to the first phase.

9. The method of claim 1, further comprising having a sensor monitoring the production equipment processing the volume of aluminum, generating monitoring data, and transmitting the monitoring data to the AI system, wherein the AI system further processes the monitoring data and refine the process of generating at least one operating condition for the first phase based on the monitoring data.

10. The method of claim 1, further comprising having another production equipment associated with the second phase, with the other production equipment processing the volume of aluminum according to another AI operating parameter.

11. The method of claim 1, further comprising having the AI system processing the at least one to-be-optimized manufacturing parameter and generating at least another operating condition for another phase among the series of subsequent phases.

12. The method of claim 11, further comprising having the AI system processing the at least one other operating condition, and generating at least one AI operating parameter for processing the volume of aluminum using another production equipment associated with the other phase.

13. The method of claim 1, further comprising having a sensor monitoring the production equipment processing the volume of aluminum, generating monitoring data during the processing of the volume of aluminum, and transmitting the monitoring data to the AI system, and
    having the AI system generating at least one modified operating condition based on the monitoring data, processing the at least one modified operating condition, and generating at least one AI modified operating parameter for processing the volume of aluminum using production equipment associated with the first phase.

14. The method of claim 13, further comprising having the production equipment associated with the first phase processing the volume of aluminum according to the at least one AI modified operating parameter.

15. The method of claim 1, comprising having sensors motoring all phases of the series of subsequent phases, having the sensors transmitting monitoring data to the AI system, and having the AI system refined based on the monitoring data.

16. The method of claim 15, comprising having the monitoring data divided between a training data set and a validation data set.

17. The method of claim 1, wherein the AI system comprises at least one AI agent.

18. The method of claim 17, wherein the AI system comprises a general AI agent and at least two associated AI agents, with the two AI agents being associated with at least one distinct phase among the series of subsequent phases.

19. The method of claim 18, wherein the general AI agent is associated with at least one of the at least one to-be-optimized manufacturing when producing the volume of aluminum.

20. The method of claim 18, wherein the general AI agent processes the at least one to-be-optimized manufacturing parameter and generates the at least one operating condition for the first phase.

* * * * *